US008860730B2

(12) United States Patent
Ooba

(10) Patent No.: US 8,860,730 B2
(45) Date of Patent: Oct. 14, 2014

(54) INFORMATION PROCESSING APPARATUS, ANIMATION METHOD, AND PROGRAM

(75) Inventor: Osamu Ooba, Tokyo (JP)

(73) Assignee: Sony Corporation, Tokyo (JP)

( * ) Notice: Subject to any disclaimer, the term of this patent is extended or adjusted under 35 U.S.C. 154(b) by 961 days.

(21) Appl. No.: 12/691,678

(22) Filed: Jan. 21, 2010

(65) Prior Publication Data
US 2010/0188409 A1   Jul. 29, 2010

(30) Foreign Application Priority Data
Jan. 28, 2009   (JP) .............................. P2009-017192

(51) Int. Cl.
G06T 13/00     (2011.01)
G06F 3/0488    (2013.01)
G06F 3/0484    (2013.01)

(52) U.S. Cl.
CPC .... G06F 3/0488 (2013.01); G06F 2203/04808 (2013.01); G06F 2203/04106 (2013.01); G06F 3/04842 (2013.01); G06F 3/04845 (2013.01)
USPC .......................................... 345/473; 345/157

(58) Field of Classification Search
CPC ...... G06T 13/00; G06T 11/00; G06F 3/04845
USPC .......................................... 345/473, 173, 157
See application file for complete search history.

(56) References Cited

U.S. PATENT DOCUMENTS

| | | | | |
|---|---|---|---|---|
| 5,347,295 A * | 9/1994 | Agulnick et al. | ............. | 345/156 |
| 5,406,307 A * | 4/1995 | Hirayama et al. | ............. | 715/800 |
| 6,111,590 A * | 8/2000 | Boezeman et al. | ............. | 345/474 |
| 6,208,360 B1 * | 3/2001 | Doi et al. | ....................... | 345/474 |
| 6,919,893 B2 | 7/2005 | Tobita et al. | | |
| 7,342,586 B2 * | 3/2008 | Jaeger | ............................. | 345/473 |
| 2006/0026536 A1 * | 2/2006 | Hotelling et al. | ............. | 715/863 |
| 2006/0077206 A1 * | 4/2006 | Jaeger | ............................. | 345/475 |
| 2007/0229466 A1 * | 10/2007 | Peng et al. | ..................... | 345/173 |

FOREIGN PATENT DOCUMENTS

| | | |
|---|---|---|
| JP | 63-106079 | 5/1988 |
| JP | 2-204791 | 8/1990 |
| JP | 4-304571 | 10/1992 |
| JP | 10-188014 | 7/1998 |
| JP | 11-149563 | 6/1999 |
| JP | 3861690 | 10/2006 |

OTHER PUBLICATIONS

Chris Maraffi, "Softimage®|XSITM Character Animation f/x & Design", © 2001, chapters 1,4 and 5, Published by Coriolis Group Books (Dec. 18, 2000), 79 pages.*
"Learning Maya 2", by Alias Wavefront Education, publisher Sybex; Paperback/DVD edition, (copyright © 1999), 32 pages.*
Adrian Reetz, Carl Gutwin, Tadeusz Stach, Miguel Nacenta, and Sriram Subramanian, 2006, "Superflick: a natural and efficient technique for long-distance object placement on digital tables", Proceedings of Graphics Interface 2006 (GI '06), Canadian Information Processing Society, Toronto, Ont., Canada, pp. 163-170.*

* cited by examiner

Primary Examiner — Maurice L McDowell, Jr.
(74) Attorney, Agent, or Firm — Sherr & Jiang, PLLC

(57) ABSTRACT

An information processing apparatus is provided which includes an input information recording unit for recording, when a movement stroke for an object is input, information on moving speed and movement stroke of an input tool used for inputting the movement stroke, and an object behavior control unit for moving the object, based on the information on moving speed and movement stroke recorded by the input information recording unit, in such a way that the movement stroke of the input tool and a moving speed at each point in the movement stroke are replicated.

20 Claims, 21 Drawing Sheets

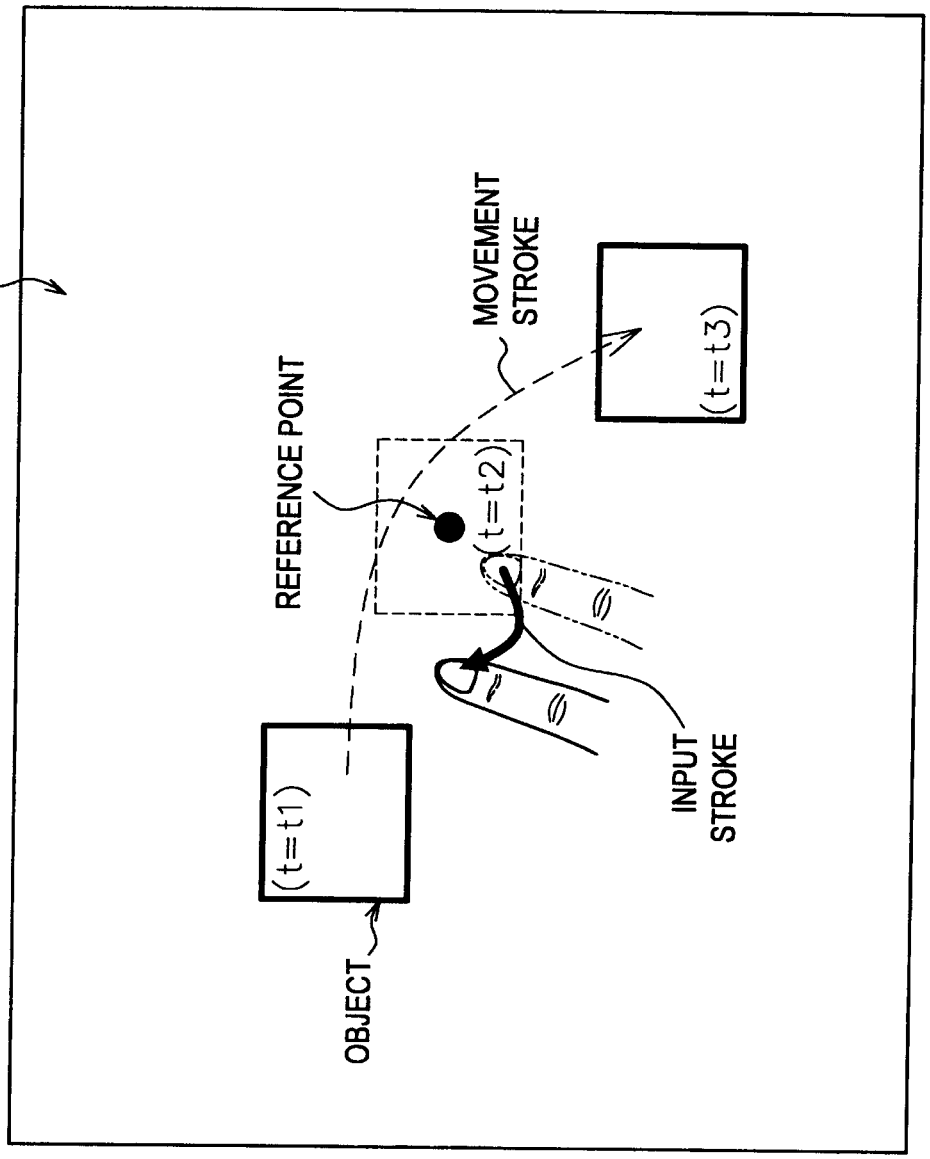

INFORMATION PROCESSING APPARATUS, ANIMATION METHOD, AND PROGRAM

BACKGROUND OF THE INVENTION

1. Field of the Invention

The present invention relates to an information processing apparatus, an animation method, and a program.

2. Description of the Related Art

Due to the recent development in semiconductor technology and information technology, comparatively cheap and high performance information processing apparatuses are becoming more popular in offices and homes. This type of information processing apparatus enables activation of various types of applications in an execution environment provided by an operating system. The types of applications used by the information processing apparatus are various, such as word processing, table calculation, database, communication and graphics. For example, an information processing apparatus with enhanced computational power and drawing capability enables to generate highly realistic graphics with comparative ease or to apply an image transformation process to the generated graphics. For example, a technology of applying an animation to a drawing object is known. The animation here means a transformation behaviour of a drawing object, such as movement, resizing, rotation or the like.

For example, with various applications for presentation, an animation can be applied to an object by selecting an object drawn on a screen and selecting an animation to be applied to the object from menu items. Furthermore, Japanese Patent No. 3861690 discloses a technology relating to an image editing apparatus for drawing on a display screen according to a hand-drawn stroke input by a user and generating an animation function while taking into account an interaction of attractive or repulsive force between adjoining drawing objects. Particularly, this technology is for expressing the interaction between drawing objects based on attribute values added to the drawing objects and generating an animation while taking the interaction into account.

SUMMARY OF THE INVENTION

As described, technologies for applying an animation to a drawing object have been known from before. However, these technologies do not enable a drawing object to be operated in such a way that the drawing object is moved along a stroke drawn freely by a user while replicating the speed of drawing the stroke. For example, an application for presentation may be equipped with a function of moving a drawing object along a stroke drawn freely by a user. However, according to this function, the drawing object will be moved at a preset speed. Also, to change the preset speed, a menu item for speed change has to be retrieved and changed, thus making user operation bothersome. Specifically, with a small electronic device or the like, since the operability of the input device is relatively poor, it is desired to simplify input processes and to improve the operability.

Thus, in light of the foregoing, it is desirable to provide novel and improved information processing apparatus, animation method and program capable of inputting a movement stroke and moving speed of a drawing object with comparatively simple input processes.

According to an embodiment of the present invention, there is provided an information processing apparatus including an input information recording unit for recording, when a movement stroke for an object is input, information on moving speed and movement stroke of an input tool used for inputting the movement stroke, and an object behaviour control unit for moving the object, based on the information on moving speed and movement stroke recorded by the input information recording unit, in such a way that the movement stroke of the input tool and a moving speed at each point in the movement stroke are replicated.

Furthermore, the information processing apparatus may further include a mode switch unit for switching between a drawing mode for drawing the object and a stroke input mode for inputting the movement stroke for the object, and an input tool distinguishing unit for distinguishing a type of the input tool. In this case, the mode switch unit switches to the drawing mode in case the type of the input tool is decided by the input tool distinguishing unit to be a first input tool, and switches to the stroke input mode in case the type of the input tool is decided by the input tool distinguishing unit to be a second input tool different from the first input tool.

Furthermore, a plurality of partial areas may be set in an area including the object, and specific behaviour types including a movement behaviour are set for respective partial areas. In this case, the information processing apparatus further includes a behaviour type selection unit for detecting in which of the plurality of partial areas a position touched at a beginning of an input operation by the input tool is included and selecting a behaviour type according to a result of the detection, when the movement stroke for the object is input. The object behaviour control unit makes the object behave according to the behaviour type selected by the behaviour type selection unit.

The behaviour type selection unit may be configured to select, in case a partial area to which a behaviour type different from the movement behaviour is set is detected, a behaviour type corresponding to a shape of the movement stroke, based on the information on movement stroke recorded by the input information recording unit.

In case a plurality of the movement strokes are input by a plurality of the input tools, the input information recording unit records information on the movement stroke input by each input tool. Furthermore, the behaviour type selection unit selects a behaviour type based on the information on the movement stroke relating to each input tool recorded by the input information recording unit.

Furthermore, an area including the object may be formed from a plurality of adjoining small rectangular areas, each smaller than one minimum-sized rectangular area capable of including a whole of the object, and each of the small rectangular areas may include a part of the object.

Furthermore, the information processing apparatus may further include an input position detection unit for detecting position coordinates of the input tool every specific time period, and an interpolation coordinate computation unit for computing interpolation coordinates to interpolate between the position coordinates of the input tool detected by the input position detection unit every specific time unit. In this case, the input information recording unit records, as the information on movement stroke, the position coordinates detected by the input position detection unit and the interpolation coordinates computed by the interpolation coordinate computation unit.

Furthermore, in case an input operation by the input tool is detected during a movement control of the object by the object behaviour control unit, the behaviour type selection unit may be configured to select the behaviour type with a position of the partial area at a time point of the detection as a reference.

According to another embodiment of the present invention, there is provided an animation method including the steps of recording, when a movement stroke for an object is input, information on moving speed and movement stroke of an input tool used for inputting the movement stroke, and moving the object, based on the information on moving speed and movement stroke recorded in the step of recording, in such a way that the movement stroke of the input tool and a moving speed at each point in the movement stroke are replicated.

According to another embodiment of the present invention, there is provided a program for causing a computer to realize an input information recording function for recording, when a movement stroke for an object is input, information on moving speed and movement stroke of an input tool used for inputting the movement stroke, and an object behaviour control function for moving the object, based on the information on moving speed and movement stroke recorded by the input information recording function, in such a way that the movement stroke of the input tool and a moving speed at each point in the movement stroke are replicated. Furthermore, according to another embodiment of the present embodiment, there may be provided a recording medium in which the program is recorded, which can be read by a computer.

As described above, according to the present invention, it becomes possible to input information on the movement stroke and moving speed of a drawing object with comparatively simple input processes.

BRIEF DESCRIPTION OF THE DRAWINGS

FIG. 20 is an explanatory diagram showing an example of an animation application method during movement according to the present embodiment.

DETAILED DESCRIPTION OF THE EMBODIMENT(S)

Figure 1:
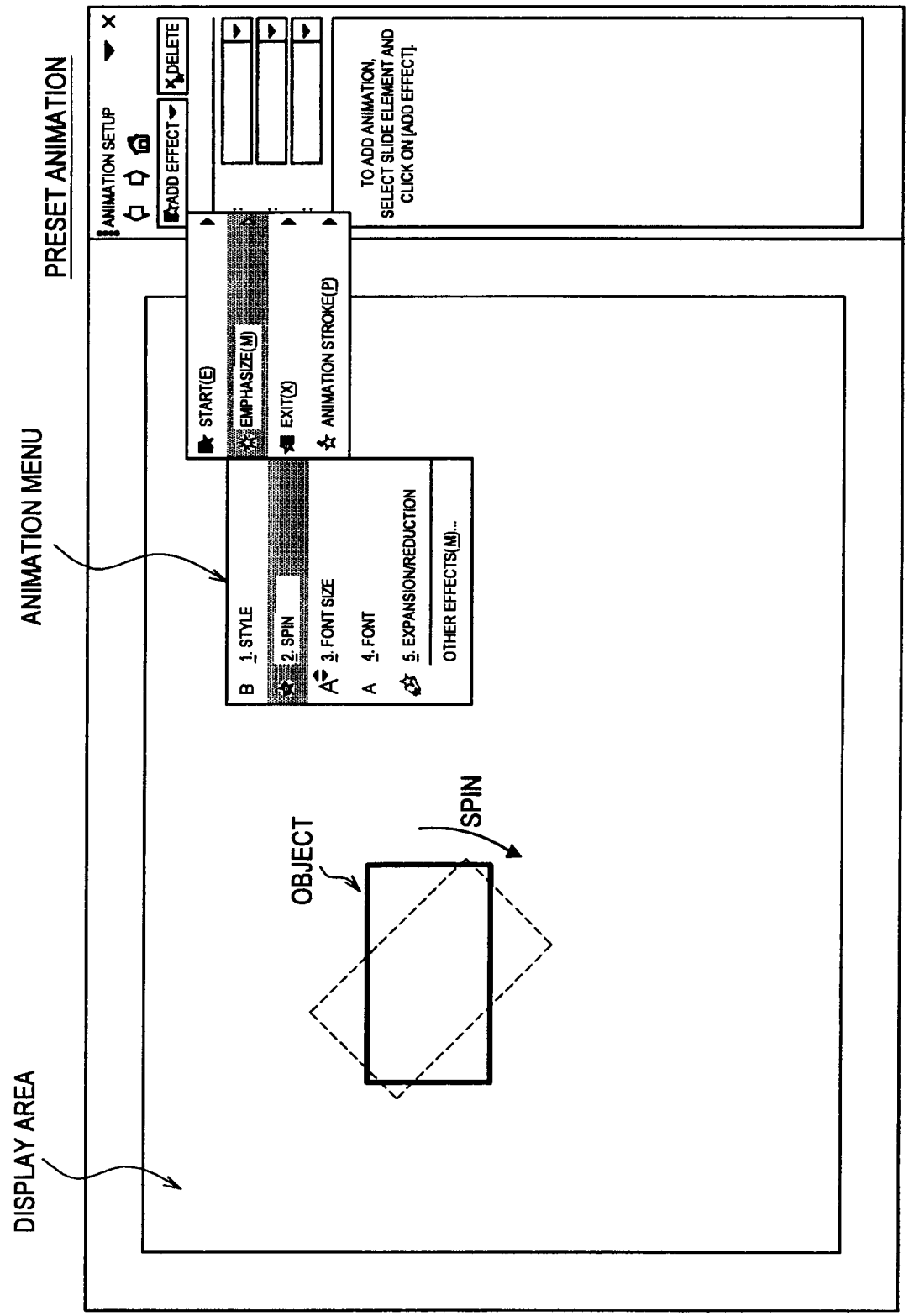
FIG. 1 is an explanatory diagram showing an example of a method for applying a preset animation.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Explanation>

Here, a flow of explanation of an embodiment of the present invention to be described below will be briefly stated. First, a method for applying a preset animation to an object will be described with reference to FIG. 1. Next, a method for applying, as an animation, a movement stroke freely inputted by a user to an object will be described with reference to FIG. 2. In the explanation, issues that the methods shown in FIGS. 1 and 2 face will be briefly summarized and issues to be solved by the embodiment of the present invention will be described.

Next, an overall functional configuration of an information processing apparatus according to the present embodiment will be described with reference to FIG. 3. Then, a detailed functional configuration of an animation processing unit of the information processing apparatus 100 will be described with reference to FIG. 4. In the explanation, an animation method according to the present embodiment will be described in detail. Particularly, a method for applying a movement animation according to the present embodiment will be shown in FIGS. 5 to 9. Then, a method for switching an input mode according to the present embodiment will be described with reference to FIG. 10. Then, a method for distinguishing the type of animation according to the present embodiment will be described with reference to FIGS. 11 to 13.

Figure 14:
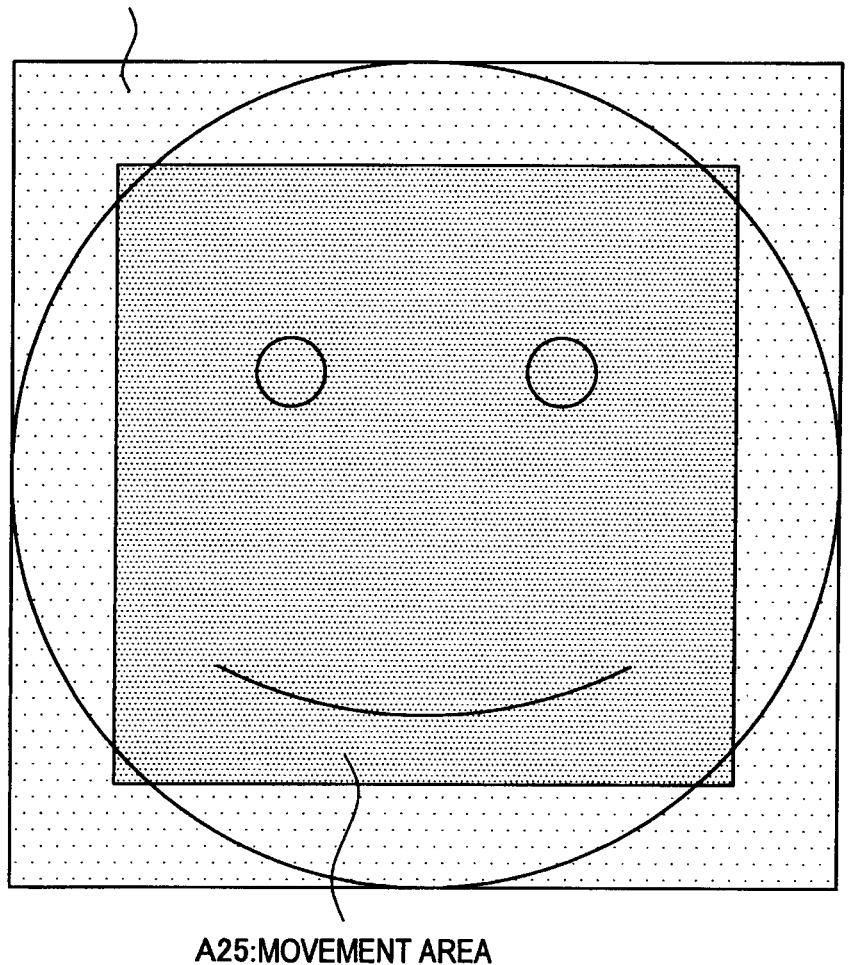
FIG. 14 is an explanatory diagram showing an example of the behaviour type distinguishing method according to the present embodiment.

Next, other methods for distinguishing the type of animation according to the present embodiment will be described with reference to FIGS. 14 and 15. Then, other methods for distinguishing the type of animation according to the present embodiment will be described with reference to FIGS. 16 and 17, the methods using multi-touch. Then, a method for setting an animation target area according to the present embodiment will be described with reference to FIG. 18. Then, a method for interpolating a movement stroke according to the present embodiment will be described with reference to FIG. 19. Next, a method for applying an animation to an object which is being moved according to the present embodiment will be described with reference to FIG. 20. Then, a hardware configuration example of the information processing apparatus 100 will be described with reference to FIG. 21. Lastly, a technical idea of the present embodiment and effects obtained from the technical idea will be briefly described.

(Explanation Items)

1: Animation Method 1-1: Method for Applying Preset Animation 1-2: Method for Applying Movement Animation along Free Stroke 2: Embodiment 2-1: Overall Functional Configuration on Information Processing Apparatus 100

2-2: Detailed Functional Configuration of Animation Processing Unit 106

2-3: Method for Switching Input Mode 2-4: Method for Distinguishing Animation Type 2-4-1: Method for Distinguishing Based on Partial Area 2-4-2: Method for Distinguishing Based on Input Stroke 2-4-3: Method for Distinguishing Based on Multi-Touch 2-5: Method for Setting Animation Target Area 2-6: Method for Interpolating Movement Stroke 2-7: Method for Applying Animation to Object Being Moved 2-8: Hardware Configuration of Information Processing Apparatus 100

2-9: Conclusion

<1: Animation Method>

First, before giving a detailed description of a technology relating to an embodiment of the present invention, an animation method of an application for presentation or the like will be briefly described. Also, issues that the animation method faces will also be briefly described.

(1-1: Method for Applying Preset Animation)

First, a method for applying a preset animation to an object will be described with reference to FIG. 1. As shown in FIG. 1, many of the applications for presentation or the like are equipped with a function for applying a preset animation to an object drawn by a user. In the example of FIG. 1, a case of applying a spinning operation to an object is shown. Moreover, in addition to the spinning operation, an expansion/reduction operation or the like may also be performed. However, the preset animation is limited to only the operations that are preset.

When applying the spinning operation to an object in such an application, a user has to select an item for applying the spinning operation from an animation setting menu (animation menu). Furthermore, a motion speed of spinning to be applied to the object is a preset speed. Normally, a preset speed is not allowed to be changed. Even if the preset speed can be changed, the user has to perform a change operation by focusing on setting items for speed change. Thus, the change operation is easy with a PC or the like connected with a mouse with high operability or a keyboard provided with numeric keys, but the operation becomes bothersome with a small electronic device not adapted to use these input devices.

(1-2: Method for Applying Movement Animation along Free Stroke)

Figure 2:
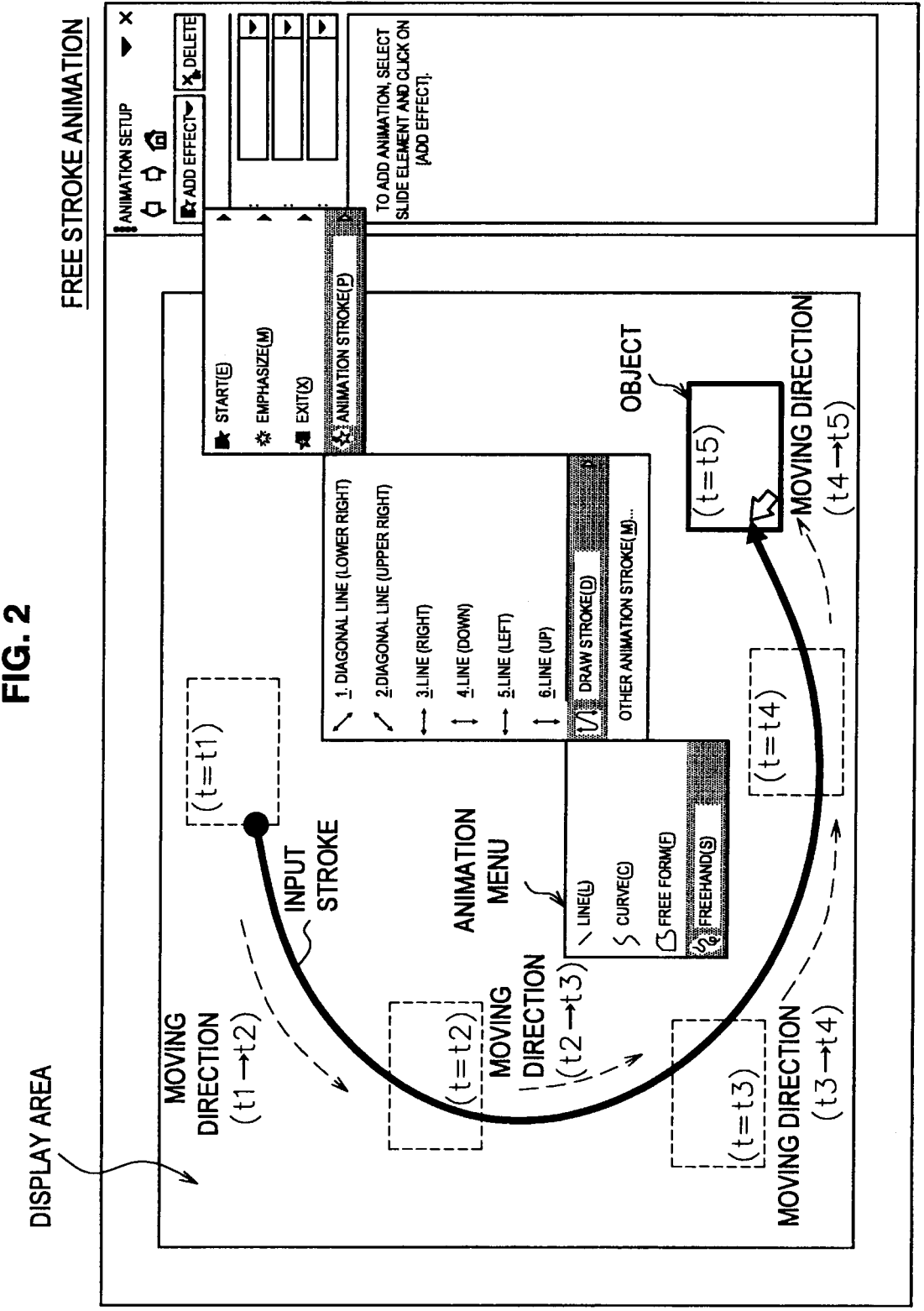
FIG. 2 is an explanatory diagram showing an example of a method for inputting a movement stroke.

Next, a method for applying to an object an animation of moving along a stroke freely input by the user will be described with reference to FIG. 2. As shown in FIG. 2, some of the applications for presentation are equipped with a function for moving an object along an input stroke that is freely drawn by the user. According to this function, when the user specifies an object to be a moving target and draws an input stroke, the object moves along the input stroke at a predetermined speed.

However, although the object moves along the input stroke that is freely drawn, the moving speed is preset. Also, even if the moving speed can be changed, bothersome operations have to be performed as in the case of the preset animation described above. Furthermore, operation processes until the execution of the movement animation are also bothersome. For example, in the example of FIG. 2, the user has to select an object for a moving target, shift to an input mode for an input stroke by following an animation menu, and then draw an input stroke. Furthermore, by performing an execution operation after the drawing of the input stroke is completed, the object is made to move along the input stroke. As described, in case of applying an animation of moving along an input stroke that is drawn freely, the operation process includes many steps compared to the operation of applying the preset animation, thus becoming bothersome.

In view of the issues described, a method is proposed in the embodiment of the present invention described below for simplifying the process of applying the animation of moving along a stroke freely input by the user. Furthermore, in the present embodiment, there is proposed a method for applying an animation according to which not only is an object moved simply along an input stroke, but the object is moved in such a way that an input speed at each point in the input stroke is replicated. Particularly, the present embodiment enables a realistic animation effect desired by the user to be applied to an object, and is expected to improve the operability regarding the animation operation. In the following, the technology according to the present embodiment will be described in detail.

<2: Embodiment>

An embodiment of the present invention will be described. The present embodiment proposes a technology for applying to an object an animation effect original to a user with comparative ease. By applying the technology to an apparatus for applying an animation by using an input device such as a touch panel, the operability can be greatly improved.

(2-1: Overall Functional Configuration on Information Processing Apparatus 100)

First, an overall functional configuration of an information processing apparatus according to the present embodiment will be described with reference to FIG. 3. FIG. 3 is an explanatory diagram showing an overall functional configuration example of the information processing apparatus 100 according to the present embodiment.

Figure 3:
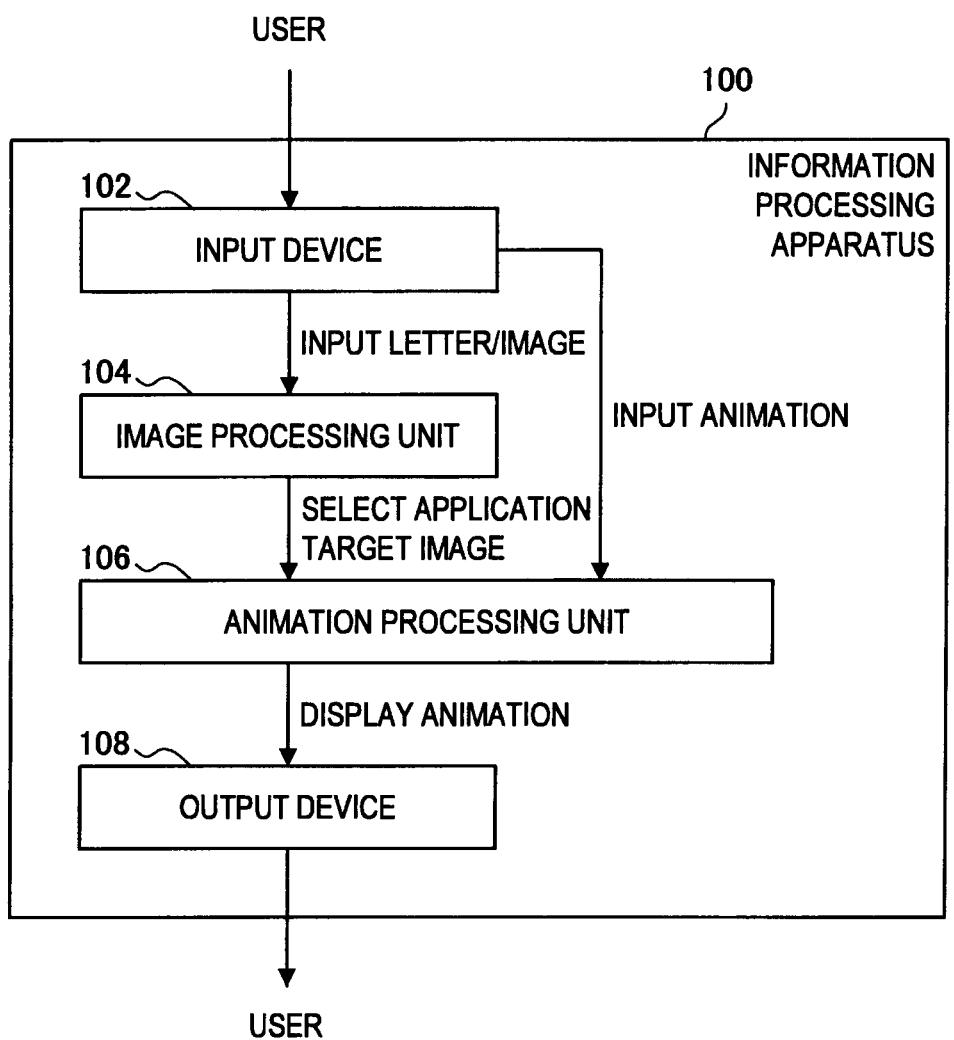
FIG. 3 is an explanatory diagram showing a functional configuration example of an information processing apparatus according to an embodiment of the present invention.

As shown in FIG. 3, the information processing apparatus 100 mainly includes an input device 102, an image processing unit 104, an animation processing unit 106 and an output device 108.

(Input Device 102)

First, the input device 102 will be described. The input device 102 is an input tool used at the time of the user drawing an object or generating an animation to be applied to the object. For example, a touch panel, a touch pad or the like is used as the input device. A stylus, a mouse or the like is of course used in combination with the touch panel, the touch pad or the like at the time of inputting information.

The information input via the input device 102 is input to the image processing unit 104 and the animation processing unit 106. For example, information on letter or image input by using the input device 102 is input to the image processing unit 104 as drawing information of an object. Also, information on stroke input by using the input device 102 is input to the animation processing unit 106 as stroke information.

(Image Processing Unit 104)

Next, the image processing unit 104 will be described. The image processing unit 104 is means for displaying on the output device 108 the drawing information of an object or the like input via the input device 102. Also, the image processing unit 104 displays on the output device 108 a user interface used when the user changes the colour at the time of drawing an object or when the user records the drawn object.

Furthermore, the image processing unit 104 switches, according to a user operation, between a drawing mode for drawing an object and an animation mode for applying an animation. This mode switching process is performed when the user presses a mode switch button included in the user interface, for example.

Figure 5:
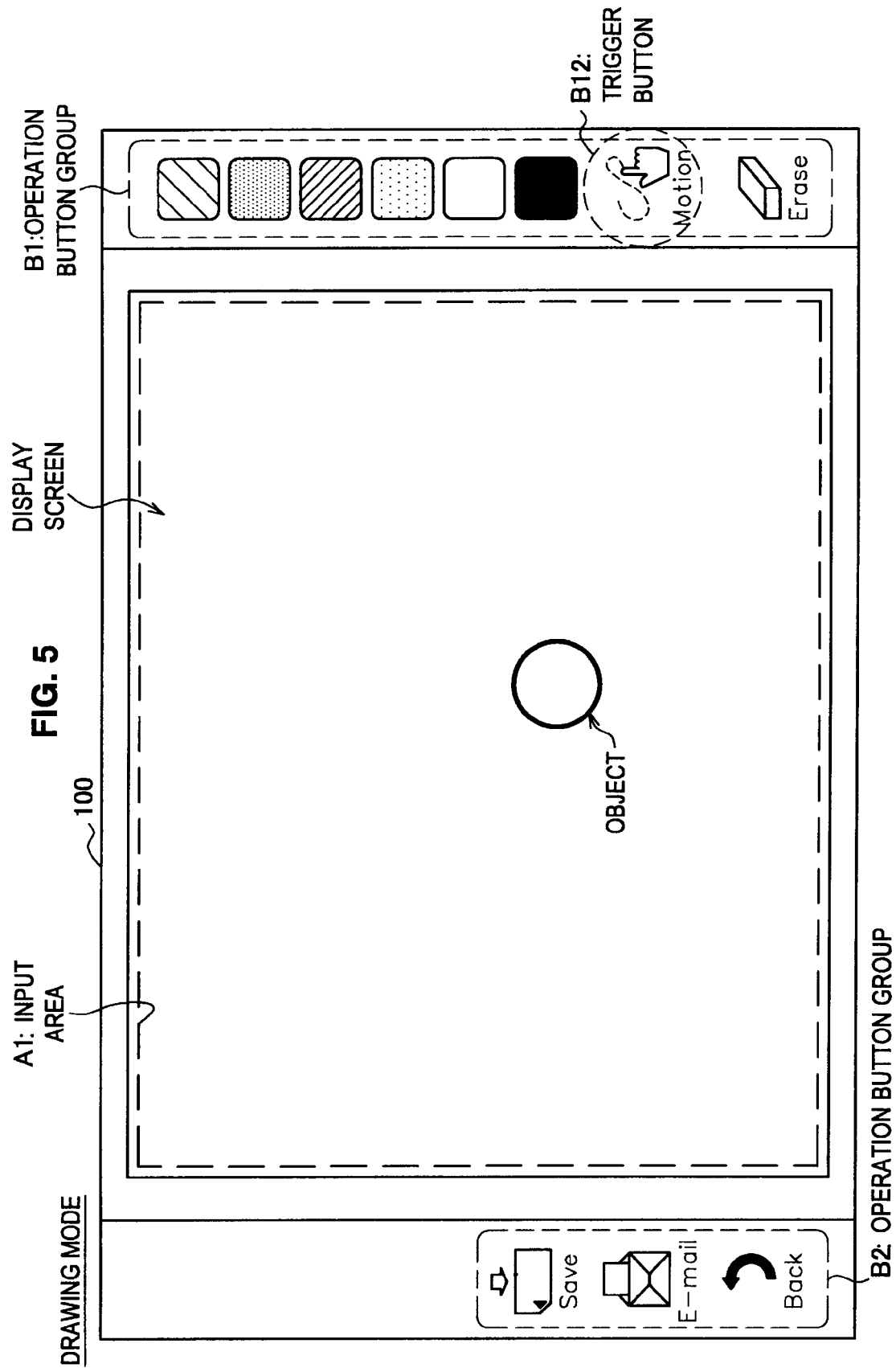
FIG. 5 is an explanatory diagram showing an example of a drawing mode screen according to the present embodiment.
Figure 6:
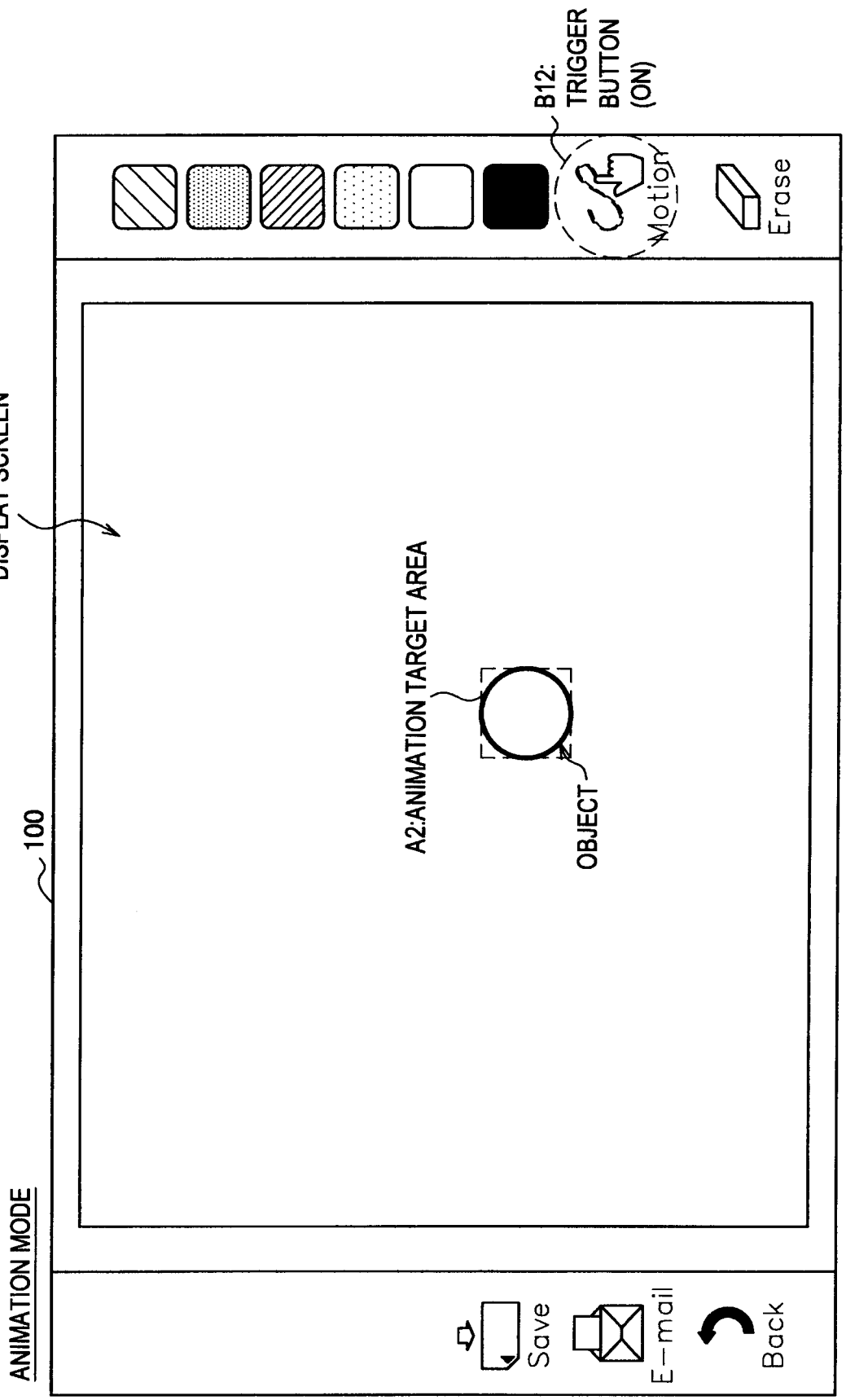
FIG. 6 is an explanatory diagram showing an example of an animation mode screen according to the present embodiment.

Here, the drawing mode and the animation mode will be briefly described with reference to concrete examples shown in FIGS. 5 and 6. FIG. 5 is an example of a screen layout displayed on the output device 108 in the drawing mode. On the other hand, FIG. 6 is an example of a screen layout displayed on the output device 108 in the animation mode.

First, reference will be made to FIG. 5. FIG. 5 shows a layout example of a display screen displayed on the output device 108 of the information processing apparatus 100. The display screen is provided with an input area A1 that is used at the time of the user drawing an object or inputting a movement stroke for the object. Furthermore, operation button groups B1 and B2 used for user operation are also provided on the display screen. The operation button groups B1 and B2 are examples of user interface provided by the image processing unit 104.

The operation button group B1 includes a colour change button used for changing the colour for drawing and a trigger button B12 for mode switching. Also, the operation button group B1 includes an erase button for erasing a drawn image. Furthermore, the operation button group B1 may also include a setting button for setting the thickness of a pen, type of line, special effect or the like.

For example, in the drawing mode, the user sets the colour for drawing by operating the colour change button, and performs an operation for drawing a figure or letter in the input area A1. Then, the figure drawn by the user is displayed on the display screen as an object by the image processing unit 104. The user can freely draw an object in this manner. Although one circular object is drawn in the example of FIG. 5, a plurality of objects may be drawn.

When drawing of an object is completed and the trigger button B12 is pressed by the user, the image processing unit 104 performs the mode switching process from the drawing mode to the animation mode. At this time, the objects drawn in the drawing mode are grouped, and an animation target area A2 is set. FIG. 6 shows an example of a screen layout after the animation target area A2 is set.

Referring to FIG. 6, the animation target area A2 is set for the object drawn in the drawing mode. An example of a screen layout for a display screen in the animation mode is shown in FIG. 6. In the example of FIG. 6, the animation target area A2 is set to be a rectangular area. Also, the animation target area A2 is displayed to include the whole object.

The animation target area A2 described above is a screen area that is to be the target of application of animation effect. When the mode is shifted to the animation mode and the animation target area A2 is set, the user can apply an animation effect to the animation target area A2. Of course, the object to which the animation effect is applied is the object included in the animation target area A2.

At the time of the trigger button B12 being pressed and the mode being shifted from the drawing mode to the animation mode, the image processing unit 104 inputs the information of an object drawn in the drawing mode (hereinafter, drawing object information) to the animation processing unit 106. Also, the image processing unit 104 inputs to the animation processing unit 106 mode switch information indicating that the mode was switched at the time point of pressing the trigger button B12. Moreover, setting processing for the animation target area A2 described above is performed by the animation processing unit 106. Thus, the drawing object information input from the image processing unit 104 to the animation processing unit 106 is information on the object drawn in the drawing mode.

For example, when the object is drawn as a vector image, vector information or the like for specifying the shape or position of the object is input to the animation processing unit 106 as the information on object. On the other hand, when the object is drawn as a raster image, information on position of dots forming the object or the like is input to the animation processing unit 106 as the information on object.

In the present embodiment, description will be made with a case where the object is drawn as a raster image as an example. The present embodiment is of course not limited to such. Incidentally, drawing data obtained via the input device 102 is a collection of position coordinates detected every specific time period. Therefore, in this case, the collection of position coordinates detected at the time of drawing the object is the information on object.

(Animation Processing Unit 106)

Referring again to FIG. 3, the animation processing unit 106 will be described. As described above, the stroke information is input to the animation processing unit 106 from the input device 102 as input information relating to animation. Also, the mode switch information and the drawing object information is input to the animation processing unit 106 from the image processing unit 104. The animation processing unit 106 is means for applying animation to an object by using these pieces of information that are input. Particularly, the animation processing unit 106 has a function of analyzing the stroke information and applying an animation effect in such a way that the input speed at the time of inputting a movement stroke via the input device 102 is replicated.

For example, when the trigger button B12 is pressed and the mode is shifted from the drawing mode to the animation mode, the animation processing unit 106 sets the animation target area A2 based on the drawing object information input from the image processing unit 104 (refer to FIG. 6). Also, when the user inputs a movement stroke, the animation processing unit 106 analyses the movement stroke input from the input device 102 and applies an animation effect to an object included in the animation target area A2 in such a way that the input speed of the movement stroke is replicated.

Figure 7:
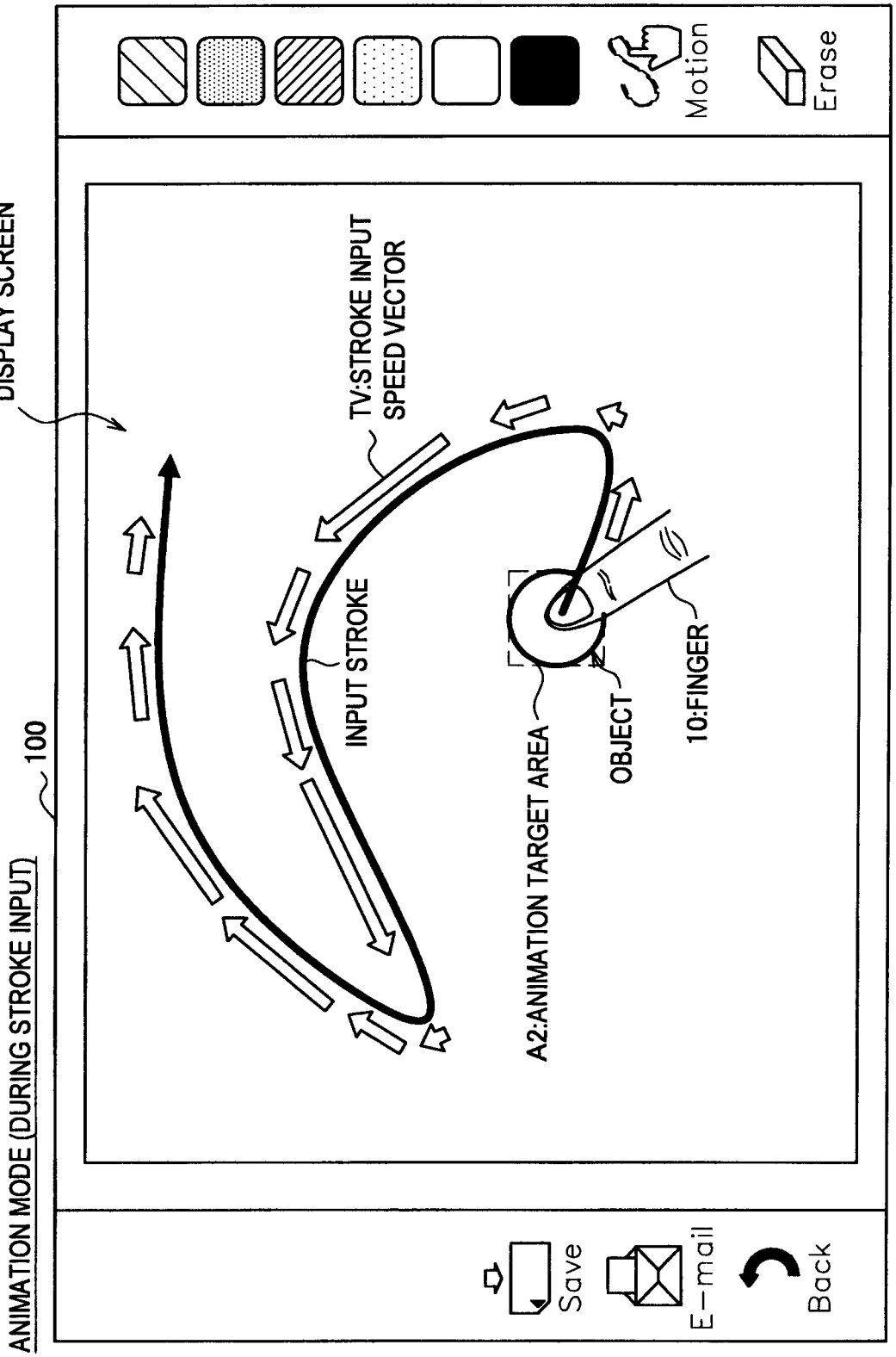
FIG. 7 is an explanatory diagram showing an example of the animation mode screen according to the present embodiment.
Figure 8:
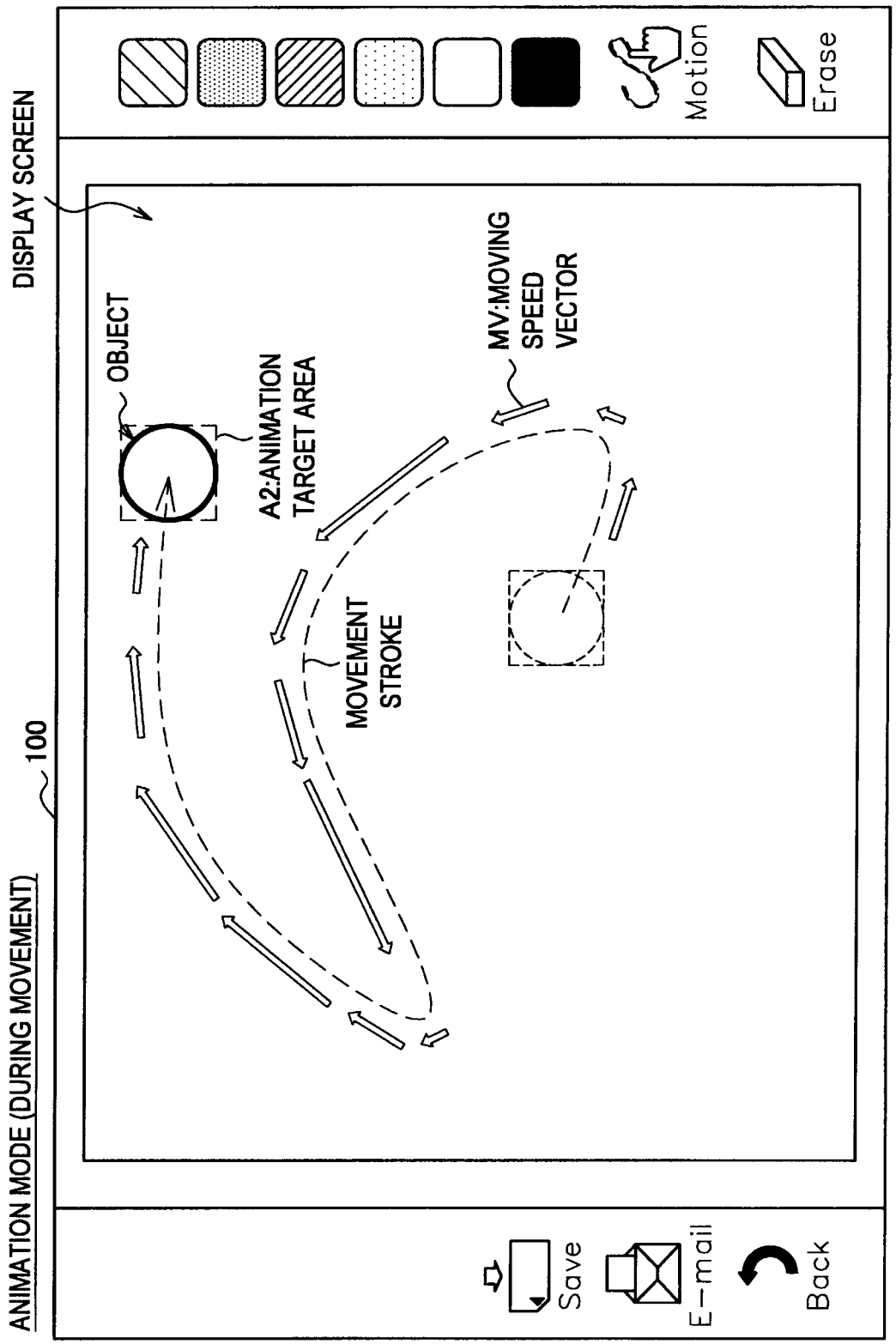
FIG. 8 is an explanatory diagram showing an example of the animation mode screen according to the present embodiment.

Here, referring to FIGS. 7 and 8, an input method for the movement stroke and the animation effect to be applied to an object will be briefly described. FIG. 7 is an explanatory diagram showing operation processing for a movement stroke input in the animation mode. FIG. 8 is an explanatory diagram showing an example of the animation effect applied to an object when the movement stroke illustrated in FIG. 7 is input. Incidentally, in the examples of FIGS. 7 and 8, the input device 102 is assumed to be a touch panel for the sake of convenience.

As described above, when the mode is shifted to the animation mode from the drawing mode, the animation target area A2 is set by the animation processing unit 106 (refer to FIG. 6). Then, the user can input a movement stroke by touching the animation target area A2 with a finger 10 and sequentially drawing a desired stroke for moving the object.

In this manner, in the present embodiment, the user can freely draw a movement stroke. Also, white arrows (stroke input speed vector TV) are shown in FIG. 7. The size of each arrow indicates the magnitude of the speed of the user's input stroke at each dot at the time of the input.

Referring to the stroke input speed vector TV, it can be seen from the example of FIG. 7 that the input speed is not constant for each part of the input stroke at the time of the user inputting the movement stroke. As described later, in the present embodiment, an animation effect reflecting the input speed is applied to an object. Thus, the user can make the moving speed of an object to be variable by changing the input speed at the time of inputting a movement stroke. Incidentally, the input stroke and the stroke input speed vector TV that are respectively shown by a thick line and arrows in FIG. 7 are shown for the sake of explanation and are not displayed on the actual display screen.

Next, reference will be made to FIG. 8. When the movement stroke illustrated in FIG. 7 is input, the animation processing unit 106 applies an animation effect to the object included in the animation target area A2. The movement stroke for the object is shown with a dotted line in FIG. 8. Also, a moving speed vector MV indicating the moving speed of the object is shown in FIG. 8 with arrows. The length of the moving speed vector MV indicates the magnitude of the moving speed of the object at each part. As shown in FIG. 8, the animation processing unit 106 moves the object along the input stroke while replicating the magnitude of the stroke input speed vector TV at each part.

In this manner, the animation processing unit 106 analyses the information on the input stroke input in a manner as shown in FIG. 7 and computes the magnitude of the moving speed vector MV at each part of the movement stroke. Then, the object included in the animation target area A2 is moved in such a way that the stroke input speed vector TV at each part of the input stroke is replicated (refer to FIG. 8). The animation processing unit 106 may be configured to apply an animation effect to an object in such a way that MV equals TV, or may be configured to apply the animation effect to an object in such a way that MV equals α×TV (α≠1). Incidentally, analysis processing by the animation processing unit 106 and the details of the method for applying an animation will be described later.

(Output Device 108)

Referring again to FIG. 3, the output device 108 will be described. The output device 108 is display means for displaying the object or the like. Also, a user interface used for drawing an object or for applying an animation is also displayed on the output device 108. For example, a display device such as a LCD or an ELD or a touch panel is used for the output device 108. The LCD described above is an abbreviation for Liquid Crystal Display. Also, the ELD described above is an abbreviation for Electro-Luminescence Display. In case a touch panel is used for the output device 108, the output device 108 and the input device 102 may be formed integrally.

Heretofore, the overall configuration of the information processing apparatus 100 according to the present embodiment has been described. In the following, the animation processing unit 106, which is a structural element unique to the information processing apparatus 100 according to the present embodiment, will be described in detail.

(2-2: Detailed Functional Configuration of Animation Processing Unit 106)

Figure 4:
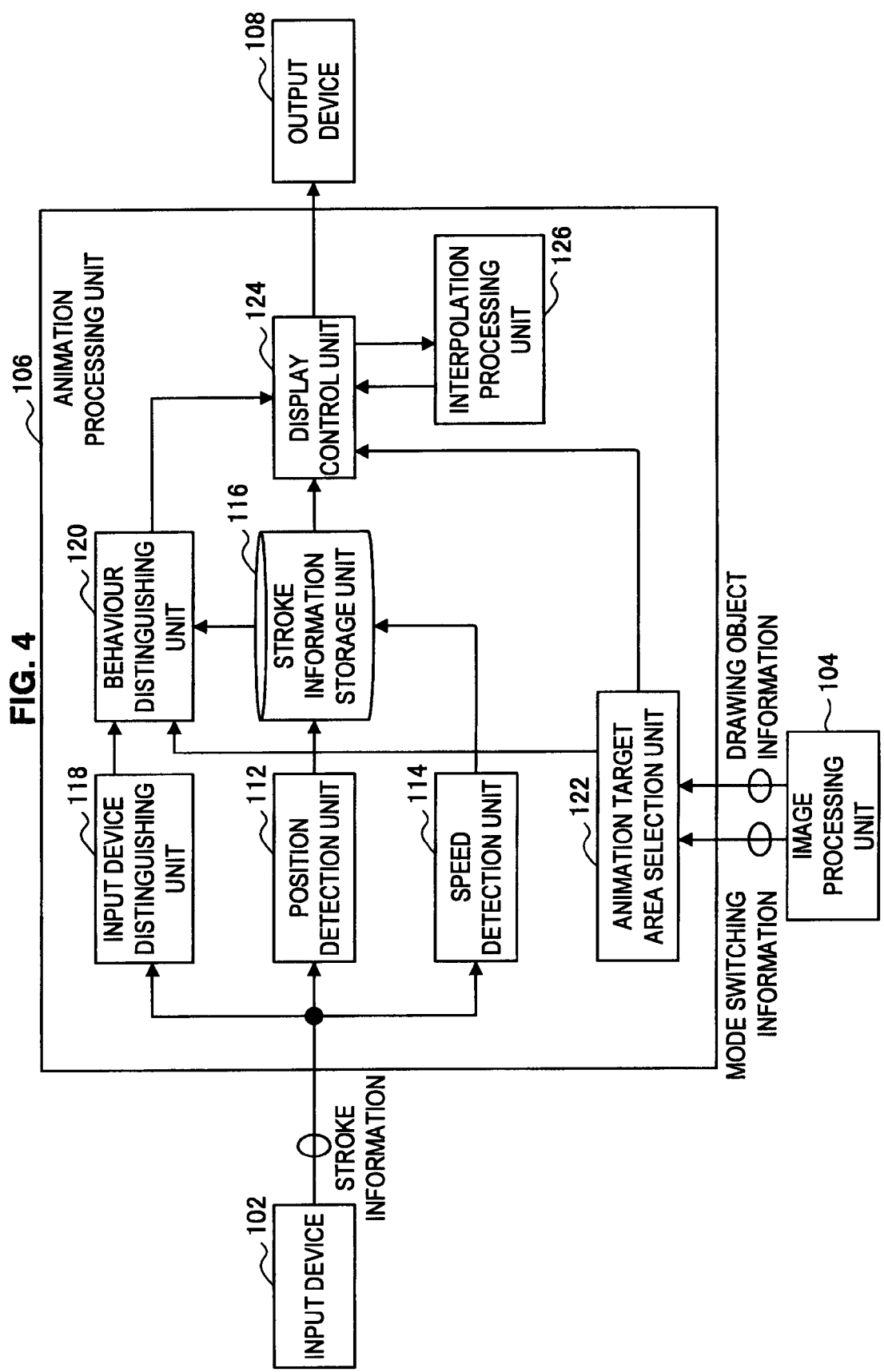
FIG. 4 is an explanatory diagram showing a functional configuration example of an animation processing unit according to the present embodiment.

First, a detailed functional configuration of the animation processing unit 106 of the information processing apparatus 100 will be described with reference to FIG. 4. FIG. 4 is an explanatory diagram showing a detailed functional configuration of the animation processing unit 106 according to the present embodiment.

As shown in FIG. 4, the animation processing unit 106 mainly includes a position detection unit 112, a speed detection unit 114, a stroke information storage unit 116, an input device distinguishing unit 118, and a behaviour distinguishing unit 120. Also, the animation processing unit 106 includes an animation target area selection unit 122, a display control unit 124, and an interpolation processing unit 126.

As described above, the drawing object information and the mode switch information are input to the animation processing unit 106 from the image processing unit 104. The drawing object information and the mode switch information that are input are input to the animation target area selection unit 122. Furthermore, the stroke information is input from the input device 102 to the animation processing unit 106 when a movement stroke is input in the animation mode. The stroke information that is input is input to the position detection unit 112, the speed detection unit 114, and the input device distinguishing unit 118.

When the mode switch information is input to the animation target area selection unit 122, the animation target area selection unit 122 selects an animation target area A2 based on the drawing object information that was input together. At this time, for example, the animation target area selection unit 122 refers to the drawing object information, and selects a minimum rectangular area capable of including all of the grouped objects as the animation target area A2.

Of course, the shape of the animation target area A2 is not limited to such, and any shape can be set as long as it is a closed area. Here, for the sake of convenience, the animation target area A2 is assumed to be a rectangular area. Information on the animation target area A2 selected by the animation target area selection unit 122 is input to the behaviour distinguishing unit 120 and the display control unit 124.

On the other hand, when the stroke information is input to the position detection unit 112, the position detection unit 112 stores the stroke information in the stroke information storage unit 116. Also, when the stroke information in input to the speed detection unit 114, the speed detection unit 114 computes the input speed based on the stroke information and stores information on the computed input speed in the stroke information storage unit 116. For example, if the stroke information is expressed as a collection of position coordinates acquired at a specific time interval at the time the movement stroke is input, the speed detection unit 114 computes the distance between the position coordinates and computes the magnitude of the speed by dividing the computed distance between the position coordinates by a specific time. Moreover, the direction of the speed at each position coordinate is given as the direction of a vector connecting the adjacent position coordinates.

As described, the stroke information stored by the position detection unit 112 and information on the input speed computed by the speed detection unit 114 are stored in the stroke information storage unit 116. The stroke information and the information on the input speed stored in the stroke information storage unit 116 are read out by the behaviour distinguishing unit 120 and the display control unit 124 and are respectively used for a distinguishing process for animation type and a display control process. Incidentally, since a movement animation based on the input stroke is taken into account here, explanation of the distinguishing process for animation type will be given later.

As described above, the display control unit 124 reads out the stroke information and the information on the input speed stored in the stroke information storage unit 116. When the stroke information and the information on the input speed are read out, the display control unit 124 moves the object included in the animation target area A2 based on the stroke information. At this time, the display control unit 124 specifies a movement target object based on information on the animation target area A2 selected by the animation target area selection unit 122. Also, at the time of moving the object, the display control unit 124 refers to the information on the input speed at each position coordinate of the movement stroke and controls the moving speed of the object in such a way that the input speed at each position coordinate is replicated.

In this manner, being subjected to a display control by the display control unit 124, the output device 108 displays an object to which an animation effect is applied. As described above, in the present embodiment, not only is an object moved along the input stroke, but it is applied an animation effect which takes into account the input speed at the time of input of the movement stroke. Thus, when changing the moving speed of the object, the user does not have to retrieve the animation menu all the time or input a setting value in the setting item. Furthermore, it becomes possible to apply to the object a highly original animation effect according to which the speed changes during the movement. As described, by using the technology according to the present embodiment, a complicated animation effect can be intuitively applied with small number of operation processes.

(Overall Flow of Animation Application Process)

Figure 9:
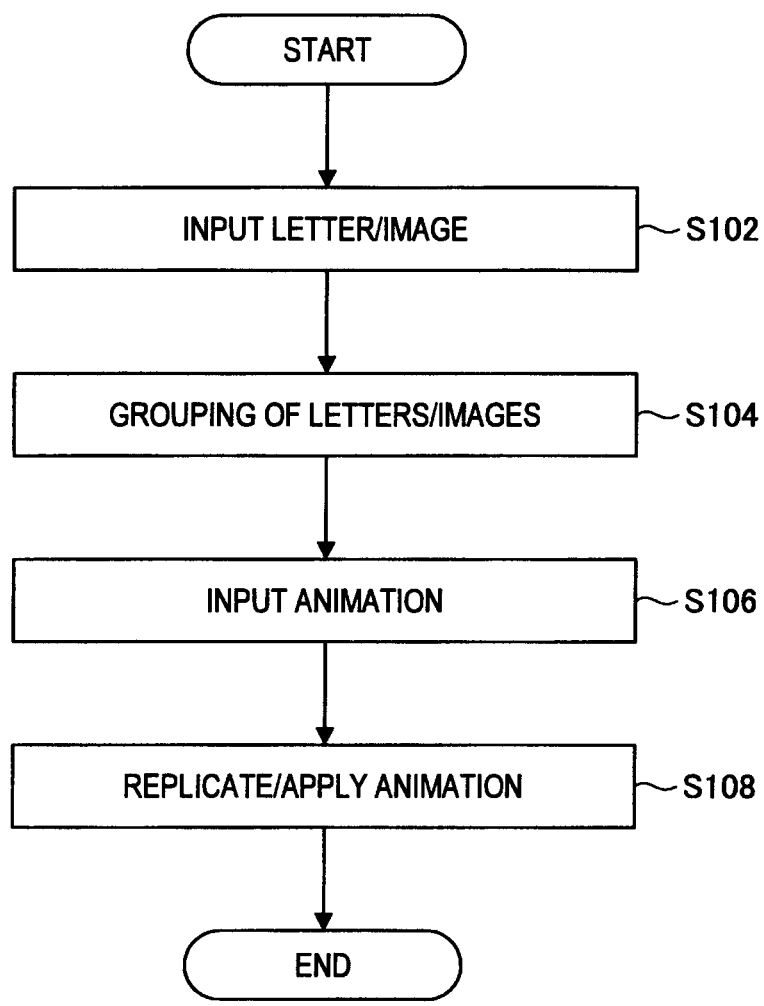
FIG. 9 is an explanatory diagram showing a flow of an animation application process according to the present embodiment.

Here, an overall flow of animation application process according to the present embodiment will be briefly described with reference to FIG. 9. FIG. 9 is an explanatory diagram showing an overall flow of the animation application process according to the present embodiment.

As shown in FIG. 9, first, a letter or a figure is input by the user via the input device 102 (S102). Then, information on the letter or figure detected by the input device 102 is input to the image processing unit 104. Furthermore, when the trigger button B12 is operated by the user and the mode is switched from the drawing mode to the animation mode, letters or figures are grouped by the image processing unit 104 (S104) and an object which is to be applied an animation is formed.

Furthermore, the mode switch information and the drawing object information are input from the image processing unit 104 to the animation processing unit 106, and the animation target area A2 is set. Next, when a desired movement stroke is input by the user (S106), an animation is applied by the animation processing unit 106 (S108). At this time, the animation processing unit 106 analyses the stroke information, computes the stroke input by the user and the input speed at each position coordinate of the input stroke, and moves the object in such a way that the input stroke and the input speed are replicated. In the present embodiment, the animation is applied according to this flow.

Heretofore, the configuration of the information processing apparatus 100 according to the present embodiment and the flow of the animation application process have been described. However, in the above description, the movement animation is taken into account, and explanation of a configuration for applying other animation effects has been omitted. Thus, in the following, a method for switching between a plurality of animations by a simple operation will be described, taking into account a case of applying other animation effects. Also, referring to FIGS. 5 to 8, explanation will be made on methods different from the explained method with regard to the input mode switching method and the animation method. Incidentally, these methods are all realized by the information processing apparatus 100.

(2-3: Method for Switching Input Mode)

Figure 10:
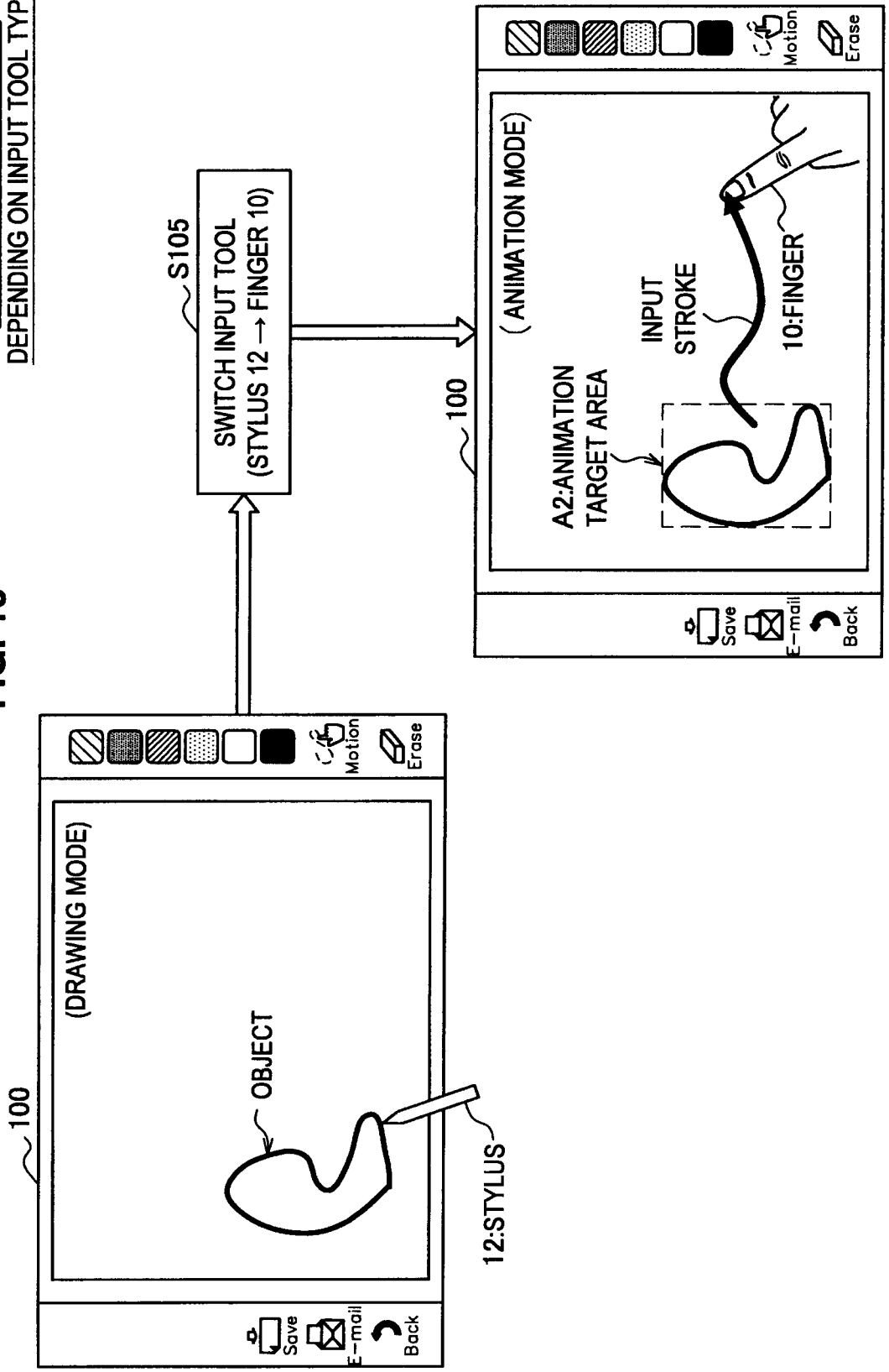
FIG. 10 is an explanatory diagram showing an example of an input mode switching method according to the present embodiment.

First, an input mode switching method different from the methods shown in FIGS. 5 and 6 will be described with reference to FIG. 10. FIG. 10 is an explanatory diagram showing an input mode switching method different from the methods shown in FIGS. 5 and 6.

The mode switching method shown in FIG. 10 has its premise that the type of input tool can be distinguished by the input device 102 or the image processing unit 104. To realize a distinguishing process for the input tool, an input device 102 having both the function of a capacitive touch panel and a function of an electromagnetic inductive touch panel may be used. In this case, a stylus 12 with a magnet at its tip and the finger 10 are used as the input tools, for example. Furthermore, in the example of FIG. 10, it is set that the mode is shifted to the drawing mode in case input is performed by the stylus 12 and is shifted to the animation mode in case the input is performed by the finger 10.

First, the user draws an object that is to be the target of application of animation by using the stylus 12. At this time, the input device 102 detects the input by the stylus 12 by the function of the electromagnetic inductive touch panel. Thus, it can be decided by the input device 102 or the image processing unit 104 that the input tool is the stylus 12. When it is decided that the input tool is the stylus 12, the input by the stylus 12 is decided to have been drawn in the drawing mode and is displayed as an object on the output device 108 by the image processing unit 104. Here, if the input tool is switched from the stylus 12 to the finger 10 (S105), the switching process from the drawing mode to the animation mode is performed by the image processing unit 104.

The switching of the input mode is performed at the time point of the finger 10 touching the input device 102. The finger 10 is not detected by the function of the electromagnetic inductive touch panel of the input device 102. Thus, input by the finger 10 is detected only by the function of the capacitive touch panel. As a result, it can be decided by the input device 102 or the image processing unit 104 that the input tool is the finger 10. When it is decided that the input tool is the finger 10, the image processing unit 104 switches the mode from the drawing mode to the animation mode and inputs the mode switch information and the drawing object information to the animation processing unit 106. Then, the animation processing unit 106 sets the animation target area A2 based on the drawing object information.

When the mode is shifted to the animation mode, the user can freely input a movement stroke. However, the input of the movement stroke has to be performed by the finger 10. On the other hand, when input is performed again by the stylus 12 in the animation mode, the switching process from the animation mode to the drawing mode is performed by the image processing unit 104. As described, when using the method shown in FIG. 10, the switching process for the modes can be performed without operating the trigger button B12. As a result, the step of operating the trigger button B12 is omitted, and the user can seamlessly perform the object drawing process and the animation input process. Also, since the trigger button B12 does not have to be displayed on the screen, the display area can be economized.

Moreover, in the above explanation, although a method has been described that uses the capacitance method and the electromagnetic induction method for the distinguishing process for the input tool, the application range of the technology according to the present embodiment is not limited to such. For example, if an in-cell touch panel is used, the size or the shape of the input tool can be easily detected, and thus a configuration becomes possible according to which the switching process for the modes is performed when the shape of the input tool changes. Incidentally, the in-cell touch panel is a display panel equipped with an optical sensor array, and has a structure of detecting, by the optical sensor array, the position or the moving direction of the input tool which touched or neared the display panel. In case of using the structure as described, the distinguishing process for the input tool is performed by the image processing unit 104.

(2-4: Method for Distinguishing Animation Type)

Next, a method for distinguishing an animation type according to the present embodiment will be described with reference to FIGS. 11 to 17. Here, besides the movement animation, a rotation animation or a resizing animation are assumed. Of course, the technology according to the present embodiment can be applied to other types of animations.

(2-4-1: Method for Distinguishing Based on Partial Area)

Figure 11:
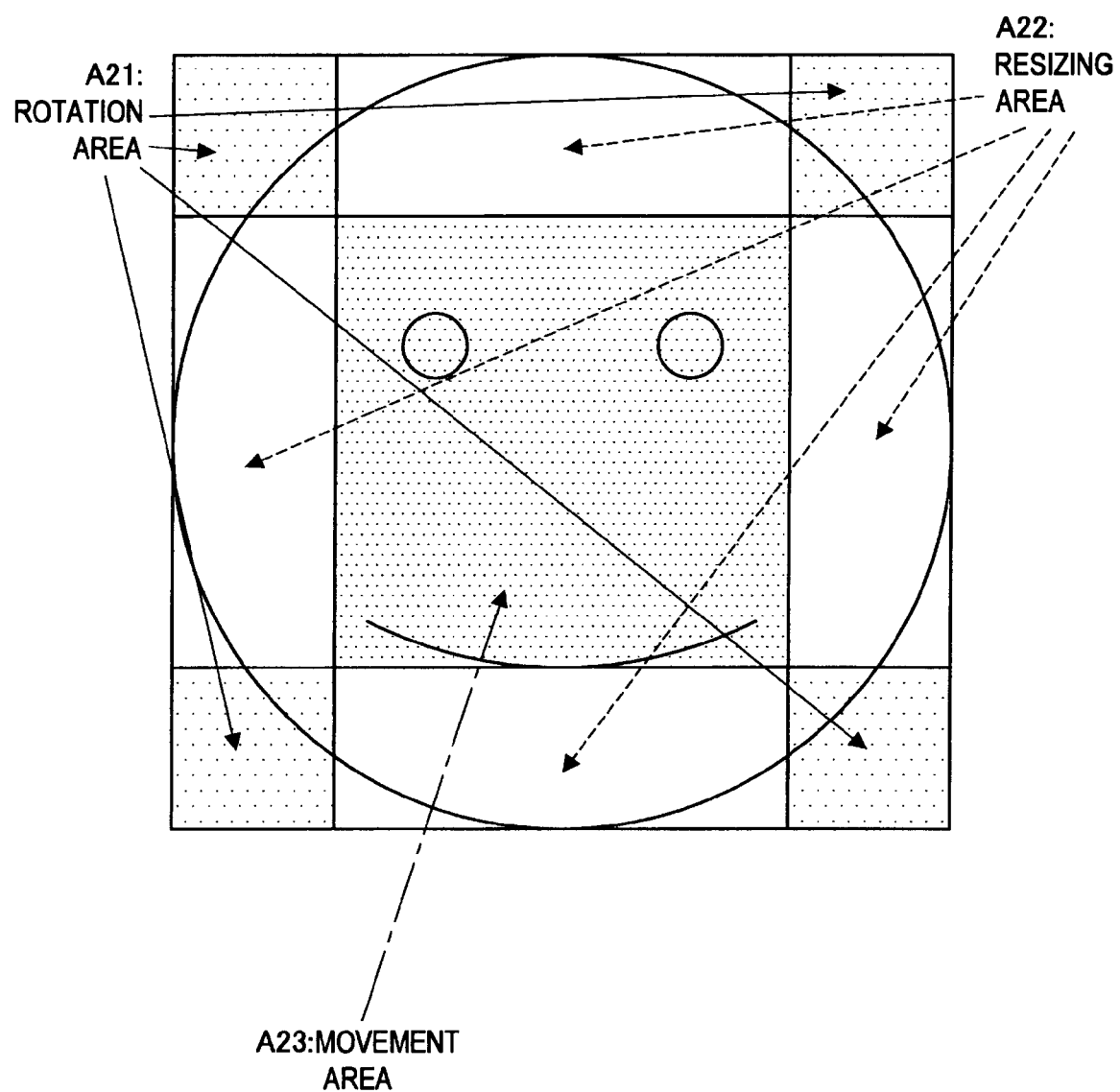
FIG. 11 is an explanatory diagram showing an example of a behaviour type distinguishing method according to the present embodiment.

First, a method for switching the animation type according to a touch position will be described with reference to FIG. 11. FIG. 11 is an explanatory diagram showing a method for distinguishing an animation type based on a partial area. In FIG. 11, a face object is drawn, and the animation target area A2 that includes the whole face is also drawn. The animation target area A2 is divided into a rotation area A21, a resizing area A22, and a movement area A23. In the following, these divided areas will be sometimes referred to as the partial areas.

(Rotation Area A21)

Figure 12:
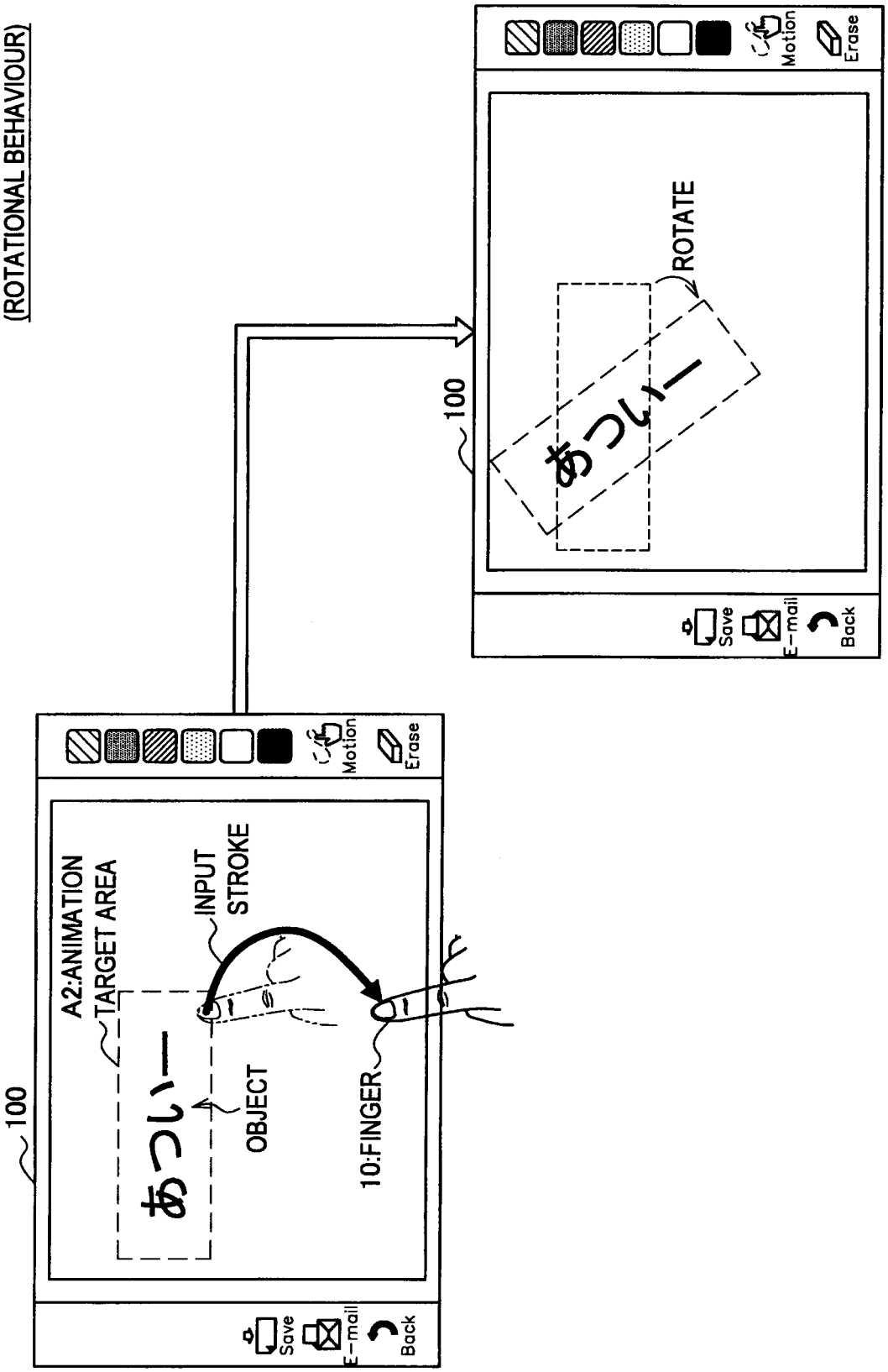
FIG. 12 is an explanatory diagram showing an example of an animation mode screen according to the present embodiment.

In the example of FIG. 11, the rotation areas A21 are set at the four corners of the animation target area A2. When the user wants to apply the rotation animation to the object, the user only has to touch the rotation area A21 and move the input tool, such as the finger 10, in the rotation direction. Then, the animation processing unit 106 decides that the animation to be applied is the rotation animation and rotates the object in the moving direction of the input tool. For example, as shown in FIG. 12, when a corner of an object is touched and an input stroke of rotation to the right is drawn, an animation effect of rotating the object to the right is applied to the object.

(Resizing Area A22)

Figure 13:
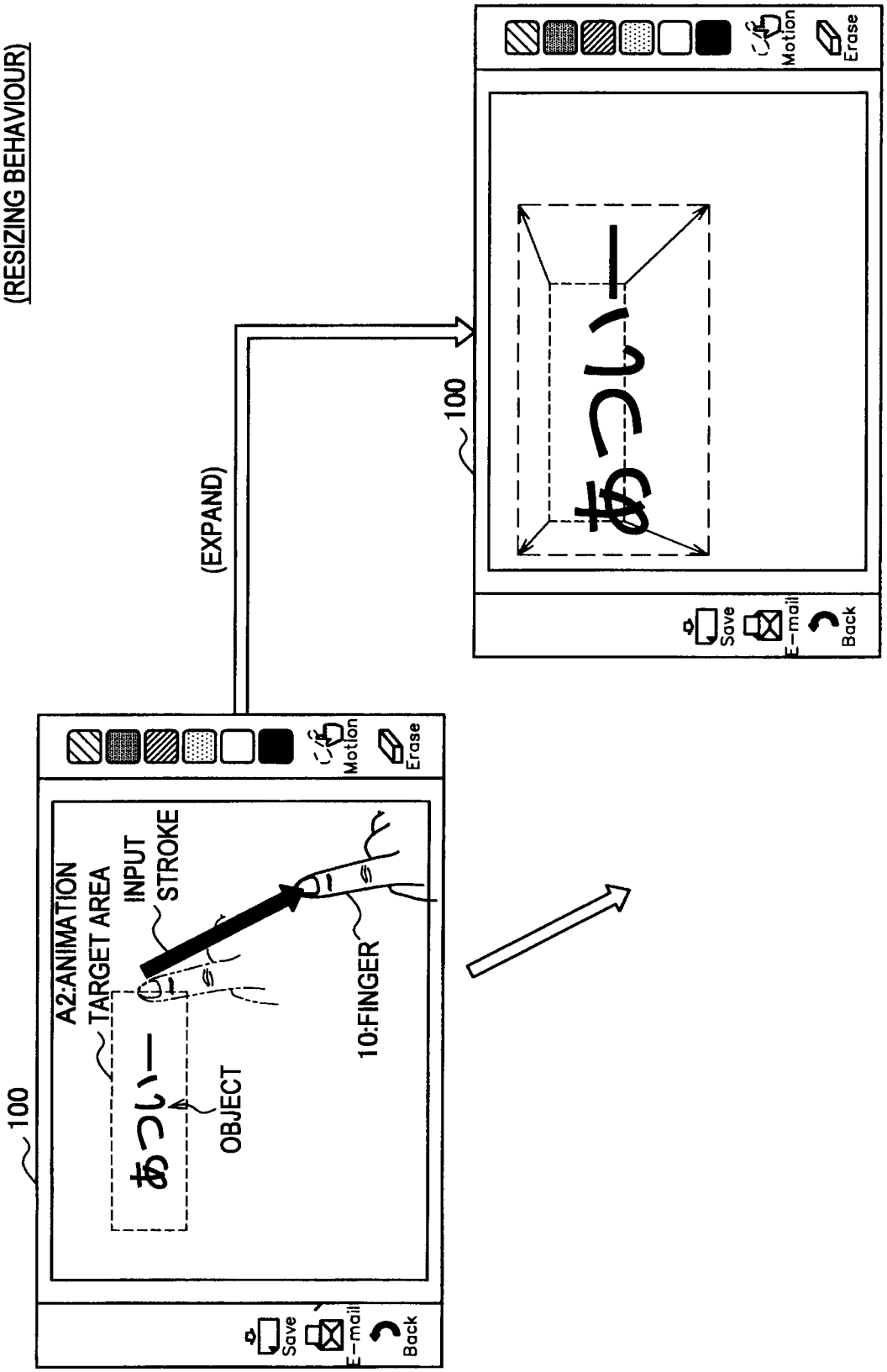
FIG. 13 is an explanatory diagram showing an example of an animation mode screen according to the present embodiment.

On the other hand, the resizing areas A22 are set in the centre of the four sides of the animation target area A2, for example. When the user wants to apply the resizing animation to the object, the user only has to touch the resizing area A22 and move the input tool, such as the finger 10, in the resizing direction. Then, the animation processing unit 106 decides that the animation to be applied is the resizing animation and resizes the object in the moving direction of the input tool. For example, as shown in FIG. 13, when the centre of a side of the object is touched and a linear input stroke towards the lower right direction is drawn, an animation effect of resizing the object towards the lower right direction is applied to the object.

(Movement Area A23)

On the other hand, the movement area A23 is set in the centre of the animation target area A2, for example. When the user wants to apply the movement animation to the object, the user only has to touch the movement area A23 and move the input tool, such as the finger 10, along a desired movement stroke. Then, the animation processing unit 106 decides that the animation to be applied is the movement animation and moves the object along the input stroke while replicating the input speed.

These distinguishing processes are performed mainly by the behaviour distinguishing unit 120 of the animation processing unit 106 (refer to FIG. 4). Also, each partial area is set by the animation target area selection unit 122. For example, after setting the animation target area A2, the animation target area selection unit 122 sets the rotation areas A21 at the four corners of the animation target area A2, sets the resizing areas A22 in the centre of the four sides, and sets the movement area A23 in the centre. The size of these partial areas is set according to a specific proportion based on the size of the animation target area A2, for example. Information on these partial areas is input to the behaviour distinguishing unit 120.

The behaviour distinguishing unit 120 refers to the stroke information stored in the stroke information storage unit 116 and decides in which partial area the position that was touched at the beginning in the animation application operation is included. Furthermore, the behaviour distinguishing unit 120 inputs, according to the distinguishing result, the type of animation associated with the partial area to the display control unit 124. For example, when the position that was touched at the beginning in the animation application operation is included in the rotation area A21, the behaviour distinguishing unit 120 inputs to the display control unit 124 information indicating that the animation type is the rotation animation.

When the type of the animation is input, the display control unit 124 reads out the stroke information from the stroke information storage unit 116 and applies to the object the animation effect of the input animation type. For example, when the animation type is the rotation animation and an input stroke for rotation to the right is drawn after the rotation area A21 is touched, the display control unit 124 applies to the object an animation effect of rotation to the right based on the stroke information. The same can be said for when the resizing area A22 is selected for the animation type. The movement animation is as already described.

As described, by dividing the animation target area A2 into partial areas and associating each partial area with an animation type, it becomes possible to seamlessly select the type of an animation to be applied to an object by a series of operations. Using this method will realize an operability better by far than an application for presentation, or the like, according to which a desired menu item is selected by scrolling through animation menus hierarchized for each animation type.

(2-4-2: Method for Distinguishing Based on Input Stroke)

Next, a method for distinguishing an animation type which combines the partial area and the input stroke will be described with reference to FIGS. 14 and 15. FIG. 14 is an explanatory diagram showing a method for setting partial areas divided from each other to distinguish between the movement animation and other animation type. FIG. 15 is an explanatory diagram showing an example of a method for distinguishing other animation type based on an input stroke.

First, reference will be made to FIG. 14. As shown in FIG. 14, the animation target area A2 is divided into a rotation/resizing area A24 and a movement area A25. The rotation/resizing area A24 corresponds to the rotation animation or the resizing animation. On the other hand, the movement area A25 corresponds to the movement animation. When the user touches the movement area A25 at the beginning of the animation application operation, the animation processing unit 106 decides that the animation type is the movement animation, and moves the object along the input stroke while replicating the input speed. The process for applying the movement animation is as already described.

On the other hand, when the user touches the rotation/resizing area A24 at the beginning of the animation application operation, the animation processing unit 106 decides the animation type from among the rotation animation and the resizing animation. This distinguishing process is performed by the behaviour distinguishing unit 120. When the mode is switched to the animation mode and the animation target area A2 is set, information on the partial area is input to the behaviour distinguishing unit 120 by the animation target area selection unit 122. Furthermore, when the rotation/resizing area A24 is selected, the behaviour distinguishing unit 120 reads out the stroke information from the stroke information storage unit 116 and selects the rotation animation or the resizing animation based on the stroke information.

Figure 15:
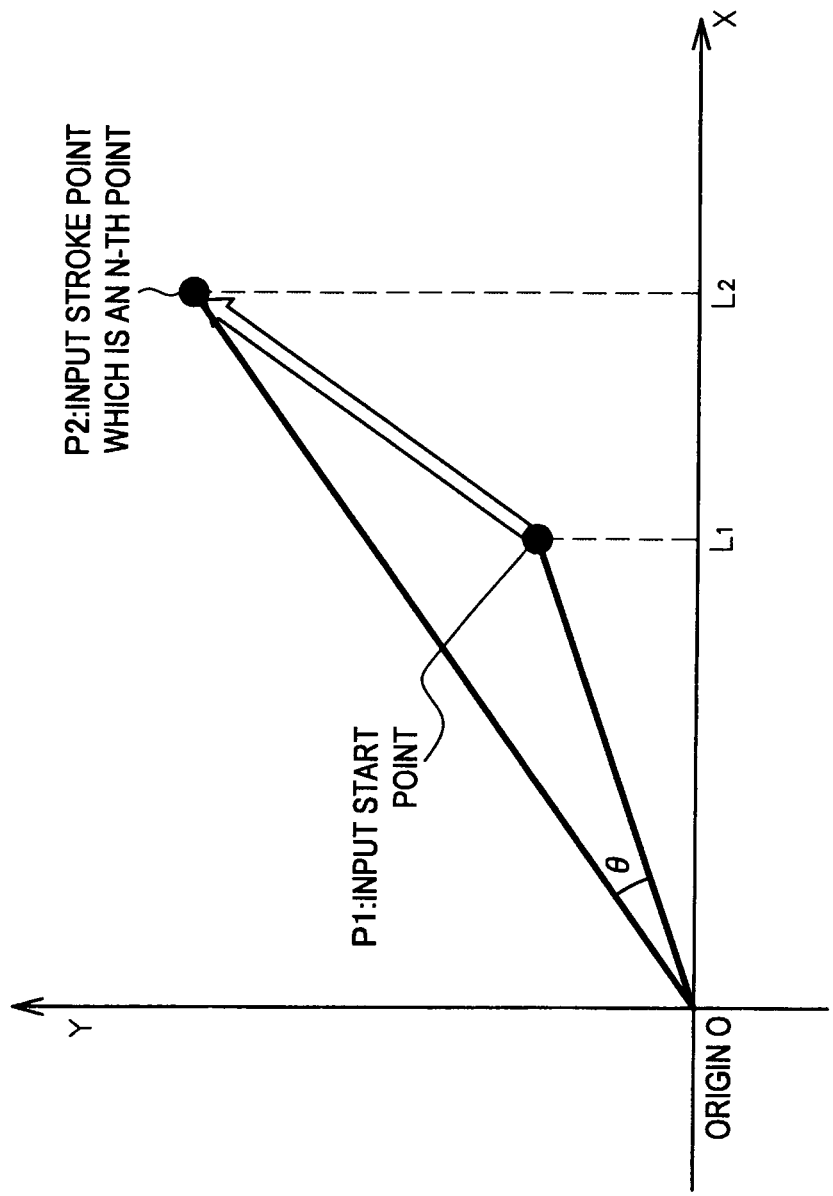
FIG. 15 is an explanatory diagram showing an example of the behaviour type distinguishing method according to the present embodiment.

For example, a method for distinguishing the animation type by using a reference value as shown in FIG. 15 can be conceived. First, the behaviour distinguishing unit 120 takes centre coordinates of the animation target area A2 as an origin O, and computes a distance L1 from the origin O to an input start point P1 and a distance L2 from the origin O to an input stroke point P2 which is an n-th point (n is a natural number) from the origin O. Moreover, the input start point P1 indicates a point the user touched at the beginning of the animation application operation. Also, the input stroke point P2 which is the n-th point indicates a point n-th from the input start point P1, among points forming the input stroke. Furthermore, the behaviour distinguishing unit 120 computes an angle θ (rotation angle θ) between a straight line connecting the origin O and the input start point P1 and a straight line connecting the origin O and the input stroke point P2. Then, the behaviour distinguishing unit 120 computes a resizing rate α=L2/L1 by using the computed distances L1 and L2.

When these parameters are computed, the behaviour distinguishing unit 120 compares the rotation angle θ and a threshold value Thθ for the rotation angle. Also, the behaviour distinguishing unit 120 compares the resizing rate α and a threshold value Thα for the resizing rate. Then, when Thθ is less than θ, the behaviour distinguishing unit 120 decides that the animation type is the rotation animation. However, when Thθ is less than θ and Thα is less than α, the behaviour distinguishing unit 120 decides that it is the rotation animation. Also, when Thα is less than α, the behaviour distinguishing unit 120 decides that the animation type is the resizing animation. Furthermore, when Thθ is more than θ and Thα is more than α, the behaviour distinguishing unit 120 decides that it is the rotation animation. Moreover, a distinguishing criterion may be changed as appropriate depending on the mode of operation. For example, if the resizing animation is to be prioritized, the distinguishing criterion is preferably changed so that the resizing animation will be selected in case Thθ is less than θ and Thα is less than α.

As described above, information on the animation type distinguished by the behaviour distinguishing unit 120 is input to the display control unit 124. When the animation type is input, the display control unit 124 reads out the stroke information from the stroke information storage unit 116 and applies to the object the animation effect of the input animation type. For example, when the animation type is the rotation animation and an input stroke of rotation to the right is drawn, the display control unit 124 applies the animation effect of rotating the object to the right. The same can be said for when the resizing animation is selected as the animation type.

With the method shown in FIG. 11, as the animation types increase, the types of the partial areas increase, making it difficult for the user to remember the types and the positions of the partial areas. Also, since the size of each partial area decreases, the operability will decrease. However, with the method described with reference to FIGS. 14 and 15, since the animation type is decided based on the input stroke, the types and the number of the partial areas can be reduced and the operability will be improved. Furthermore, by associating an intuitive gesture with an animation type, the user can easily remember the animation types and the operability will be improved.

(2-4-3: Method for Distinguishing Based on Multi-Touch)

Figure 16:
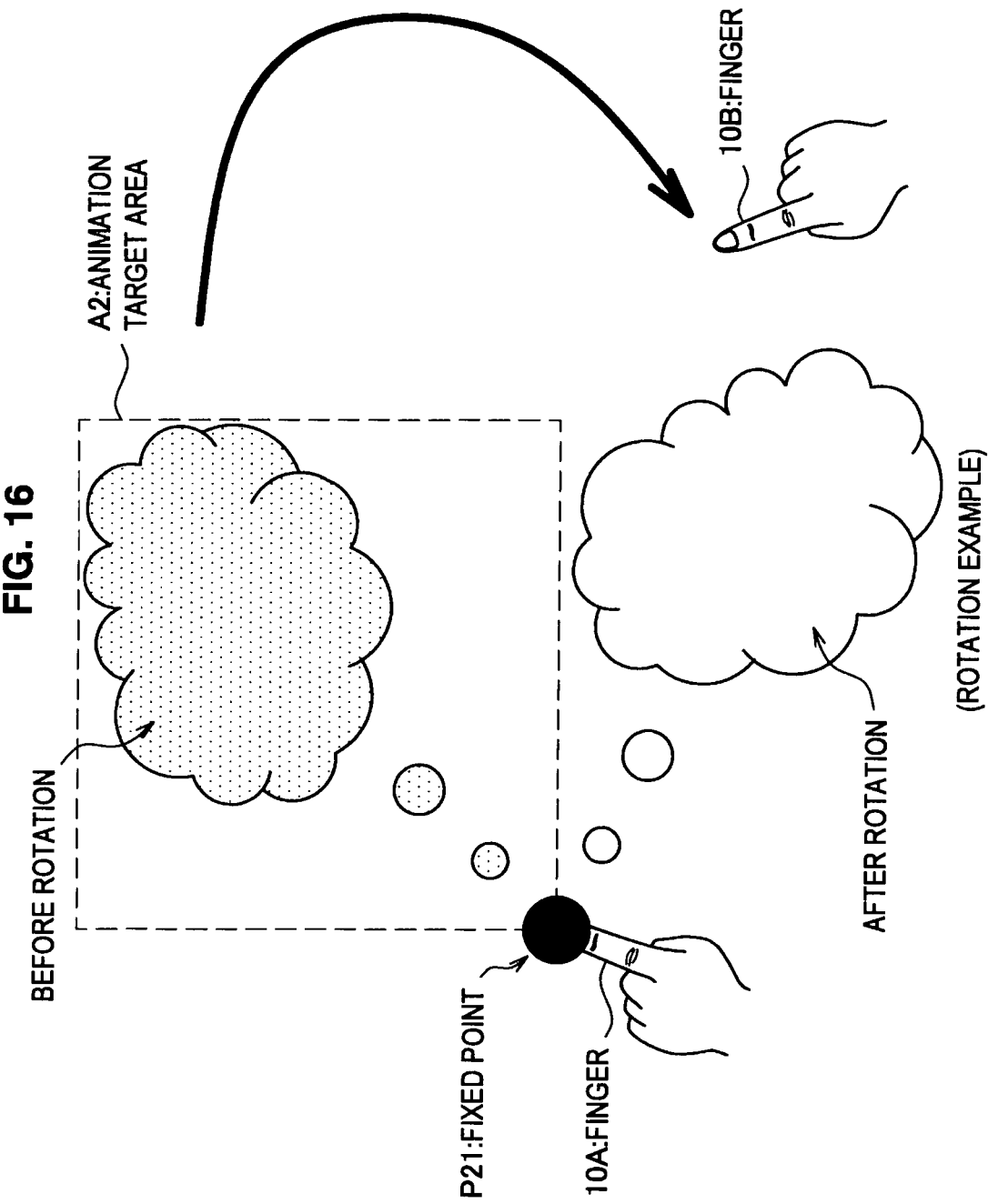
FIG. 16 is an explanatory diagram showing an example of the behaviour type distinguishing method according to the present embodiment.
Figure 17:
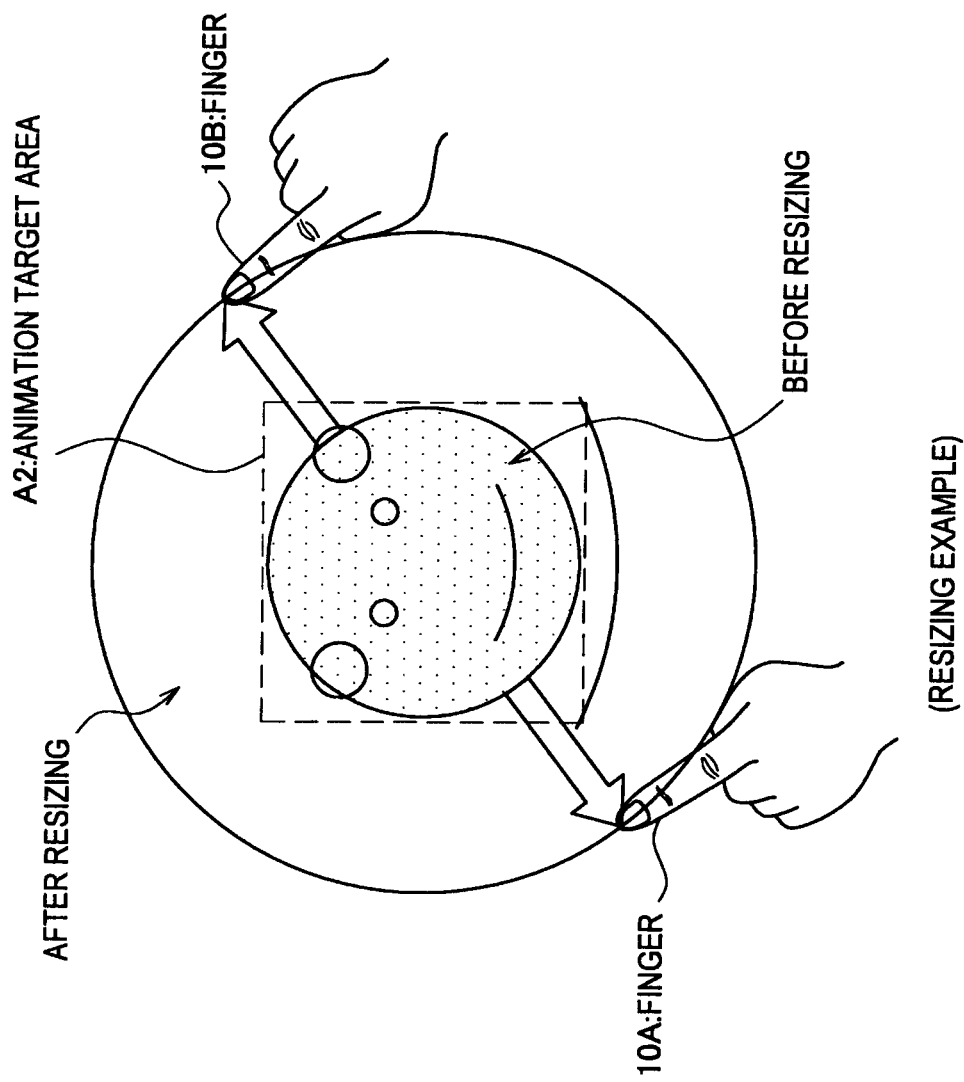
FIG. 17 is an explanatory diagram showing an example of the behaviour type distinguishing method according to the present embodiment.

Next, a method for deciding the animation type based on multi-touch will be described with reference to FIGS. 16 and 17. FIG. 16 is an explanatory diagram showing a method for applying the rotation animation by multi-touch. FIG. 17 is an explanatory diagram showing a method for applying the resizing animation by multi-touch.

Incidentally, whether it is single-touch or multi-touch is decided by the input device distinguishing unit 118 of the animation processing unit 106 based on the stroke information. For example, when a plurality of input tools are detected at the same time by the input device 102, the input device distinguishing unit 118 decides that it is multi-touch. The result of distinguishing is input to the behaviour distinguishing unit 120 from the input device distinguishing unit 118. Then, the behaviour distinguishing unit 120 switches the distinguishing process for animation type according to the result of distinguishing from the input device distinguishing unit 118. In case of single-touch, the distinguishing process for animation type is performed by any of the methods described above or any other method, and in case of multi-touch, the distinguishing process is performed in the manner described below.

For example, when the animation target area A2 is touched by one finger 10A and the input stroke is drawn by the other finger 10B as shown in FIG. 16, the behaviour distinguishing unit 120 decides that it is the rotation animation having a fixed point P21 touched by the finger 10A as the centre of rotation. At this time, the behaviour distinguishing unit 120 decides that it is the rotation animation by detecting that the finger 10A remained still while the other finger 10B moved, for example. Furthermore, a rotation direction and a rotation angle are set based on the input stroke drawn by the finger 10B. Although in case of single-touch, the centre of rotation is fixed to the centre of the animation target area A2, a centroid of the object, or the like, in case of multi-touch, the fixed point P21 can be freely set.

Furthermore, as shown in FIG. 17, when the animation target area A2 is touched by both finger 10A and finger 10B and the input stroke is drawn so as to extend the object outward, the behaviour distinguishing unit 120 decides that it is the resizing animation. At this time, the behaviour distinguishing unit 120 detects that both finger 10A and finger 10B are moved at the same time and decides that it is the resizing animation, for example. Moreover, the distinguishing processes for the rotation animation and the resizing animation may be performed by the method shown in FIG. 15, taking the rotation angle θ and the resizing rate α as the criteria. However, the rotation angle θ and the resizing rate α are computed by setting the origin O as the position of one finger and by using the input start point P1 and the input stroke point P2 of the other finger. Specifically, the animation type is decided based on the change in the relative positional relationship between the fingers 10A and 10B.

As described, by using the input device 102 compatible with multi-touch, an animation can be applied more freely. Moreover, although, in the above description, the fingers 10A and 10B are mentioned as the input tool, the present embodiment is not limited to such. For example, two styluses may be used, or the finger 10 and the stylus 12 may be used in combination. Furthermore, input tool different from the finger 10 or the stylus 12 may also be used.

Heretofore, the methods for distinguishing animation type according to the present embodiment have been described.

With the distinguishing process for animation type performed in the manner described above, a plurality of animation types can be easily selected by comparatively simple operations. The above-described methods according to the present embodiment each have succeeded in greatly reducing the operation processes compared to an animation type selection method using the animation menu, and the operability is significantly improved. As a result, the methods according to the present embodiment contribute to reducing the stress of the user during the animation application operation and to enhance the creativity of the user.

(2-5: Method for Setting Animation Target Area)

Figure 18:
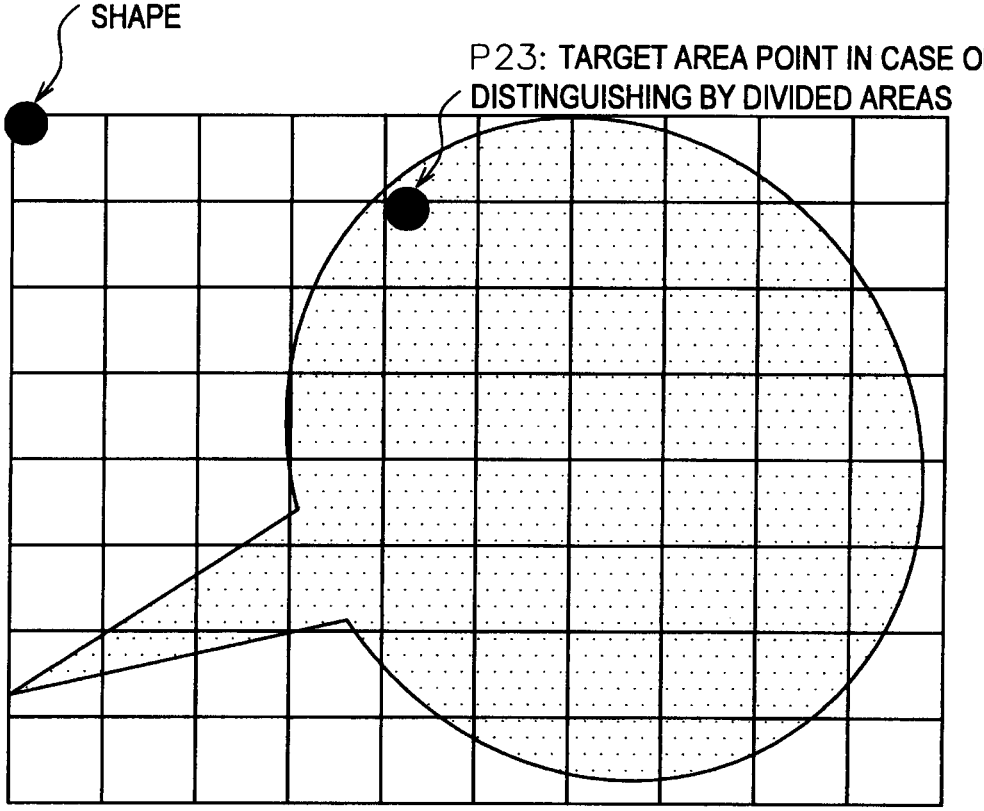
FIG. 18 is an explanatory diagram showing an example of a method for setting an input area according to the present embodiment.

Next, a method for setting an animation target area A2 not in a rectangular shape will be described with reference to FIG. 18. FIG. 18 is an explanatory diagram showing a method for setting the animation target area A2 not in a rectangular shape.

Heretofore, description has been made assuming that the animation target area A2 is a rectangular area including the object. However, if a zigzag shape is enclosed by a rectangular area, even a position far away from the boundary of the object will be included in the animation target area A2. As described above, in the present embodiment, the animation type is sometimes set in the partial area of the animation target area A2. In this case, the user has to perform the animation application operation by touching an area far away from the object. As a result, the intuitiveness for the operation is degraded.

Accordingly, as shown in FIG. 18, by forming the animation target area A2 by a collection of small areas smaller than the smallest rectangular area capable of enclosing the object without limiting the animation target area A2 to one rectangular area, an animation target area A2 adapted to the form of the object can be set. This setting process is performed by the animation target area selection unit 122 of the animation processing unit 106 (refer to FIG. 4). The animation target area selection unit 122 covers the entire object by the small areas based on the drawing object information and sets the collection of the small areas as the animation target area A2.

By performing the setting in this way, a boundary point of the animation target area A2 is changed to a position nearer to the object, i.e. from a target area point P22 to a target area point P23. As a result, even when the animation target area A2 is being operated in a practical sense, the user feels that he/she is directly operating the object, and thus a more intuitive operating system is realized. Furthermore, with the animation target area A2 being close to the shape of the object, a reference position to be referred to at the time of applying an animation effect, such as the centre, the centroid or a boundary line of the animation target area A2, nears the reference position of the object. As a result, even when an animation effect is applied to the animation target area A2, it is displayed as though the animation effect is directly applied to the object, and thus the realism of the animation effect is enhanced.

As described already, in the present embodiment, images or letters drawn in the drawing mode are grouped and are treated as one object. Thus, when a plurality of images or letters are grouped, even if the images or letters individually have a simple shape, they are likely to have a complicated shape as a whole. The method for setting the animation target area A2 using the small areas is effective in this case, and it greatly contributes to the application of a more natural animation effect.

(2-6: Method for Interpolating Movement Stroke)

Next, a method for interpolating the movement stroke according to the present embodiment will be described with reference to FIG. 19. FIG. 19 is an explanatory diagram showing a method for interpolating the movement stroke according to the present embodiment. As already described, the stroke information input via the input device 102 is information on position coordinates obtained at a specific time interval. Thus, when the user moves the input tool at a high speed, a gap between the position coordinates obtained as the stroke information becomes large. Therefore, if the movement animation is applied to the object based on the stroke information, the object will move in an unnatural way. Accordingly, to prevent such unnatural movement, the gap between the position coordinates included in the input stroke is interpolated so that the object will move smoothly.

Figure 19A:
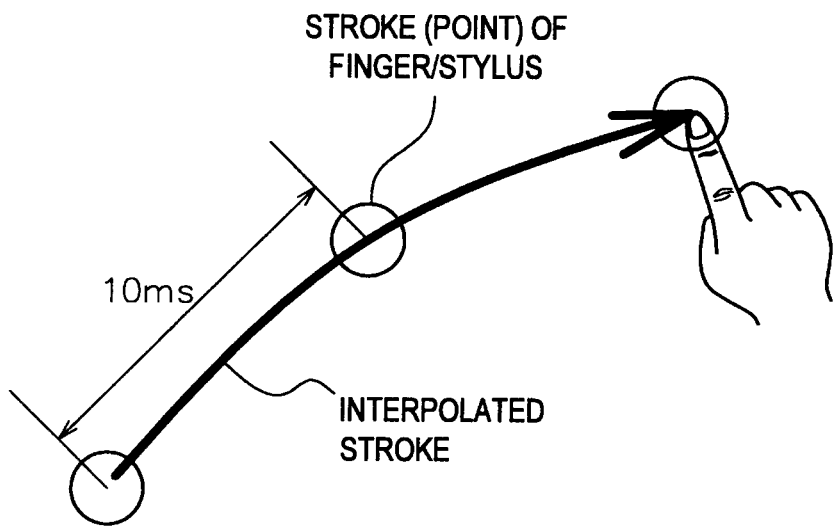
FIG. 19 is an explanatory diagram showing an example of a coordinate interpolation method according to the present embodiment.
Figure 19B:
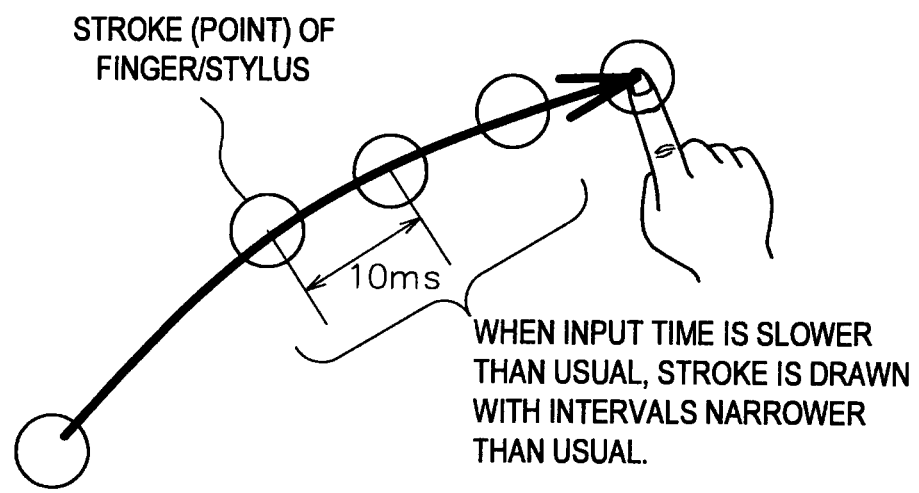

The interpolation process mentioned above is performed by the interpolation processing unit 126 of the animation processing unit 106 (refer to FIG. 4). To repeat, as shown in FIG. 19A, the input device 102 obtains the position coordinates of the input tool at a specific time interval. The specific time interval is set to about 10 msec, for example. Of course, the length of the specific time depends on the type or the like of the input device 102. As shown in FIG. 19A, if the moving speed of the input tool is constant, a collection of position coordinates arranged with an approximately constant gap is obtained as the input stroke. On the other hand, as shown in FIG. 19B, if the moving speed of the input tool is slow, a collection of position coordinates arranged with a narrow gap is obtained as the input stroke. On the contrary, if the moving speed of the input tool is fast, a collection of position coordinates arranged with a wide gap is obtained as the input stroke.

Accordingly, the interpolation processing unit 126 computes, based on the stroke information input by the display control unit 124, interpolation coordinates for interpolating between the position coordinates by using a specific interpolation method. The specific interpolation method may be a linear interpolation or a spline interpolation, for example. Of course, the interpolation coordinates may be computed by using an equation expressed by high degree polynomials. The interpolation coordinates computed by the interpolation processing unit 126 are input to the display control unit 124. Then, the display control unit 124 moves the object based on the interpolation coordinates computed by the interpolation processing unit 126 and respective coordinates of the movement stroke included in the stroke information. With this configuration, a natural animation effect is realized without depending on the ability of the input device 102 for obtaining position coordinates.

(2-7: Method for Applying Animation to Object Being Moved)

Next, a method for applying an additional animation effect to an object being moved will be described with reference to FIG. 20. FIG. 20 is an explanatory diagram showing a method for applying an additional animation effect to an object being moved. An object to which the movement animation is applied is shown in FIG. 20.

Here, a method for additionally applying the rotation animation to an object being moved at the time point of time t=t2 (t1<t2<t3) is taken into account. It should be noted that the object being moved will continue to move during the operation of additionally applying the rotation animation. Thus, the object will continue to move even during the operation by the user. In this case, since the animation target area A2 which is to be touched by the user to specify the animation type is moving, the operation of applying the rotation animation is quite difficult. The same can be said for when drawing the input stroke.

Accordingly, in the present embodiment, in case of applying an animation to an object being moved, a reference point of the animation target area A2 is made to stop at a time point of the user first touching the animation target area A2 by using the input tool for the application operation. In the example of FIG. 20, the animation target area A2 at the time point of time t=t2 is the reference for the distinguishing process. The rotation animation can be additionally applied to the object by performing the operation for applying the rotation animation already described after the reference point is made to stop. In this case, the rotation animation is reflected on the moving object by the display control unit 124. The rotation animation is mentioned here as the example, but the same can also be said for the resizing animation or other animation.

As described, by enabling to apply an additional animation, it becomes possible to construct a complicated animation step-by-step while checking the movement of the object. Also, even if the animation is complicated, since the animation target area A2 is stopped at the time point of touching to apply an additional animation, the operation method itself does not change. Accordingly, the user does not have to memorize a complicated operation method for applying a complicated animation, and the trouble of the user can be saved to a great degree.

(2-8: Hardware Configuration of Information Processing Apparatus 100)

Figure 21:
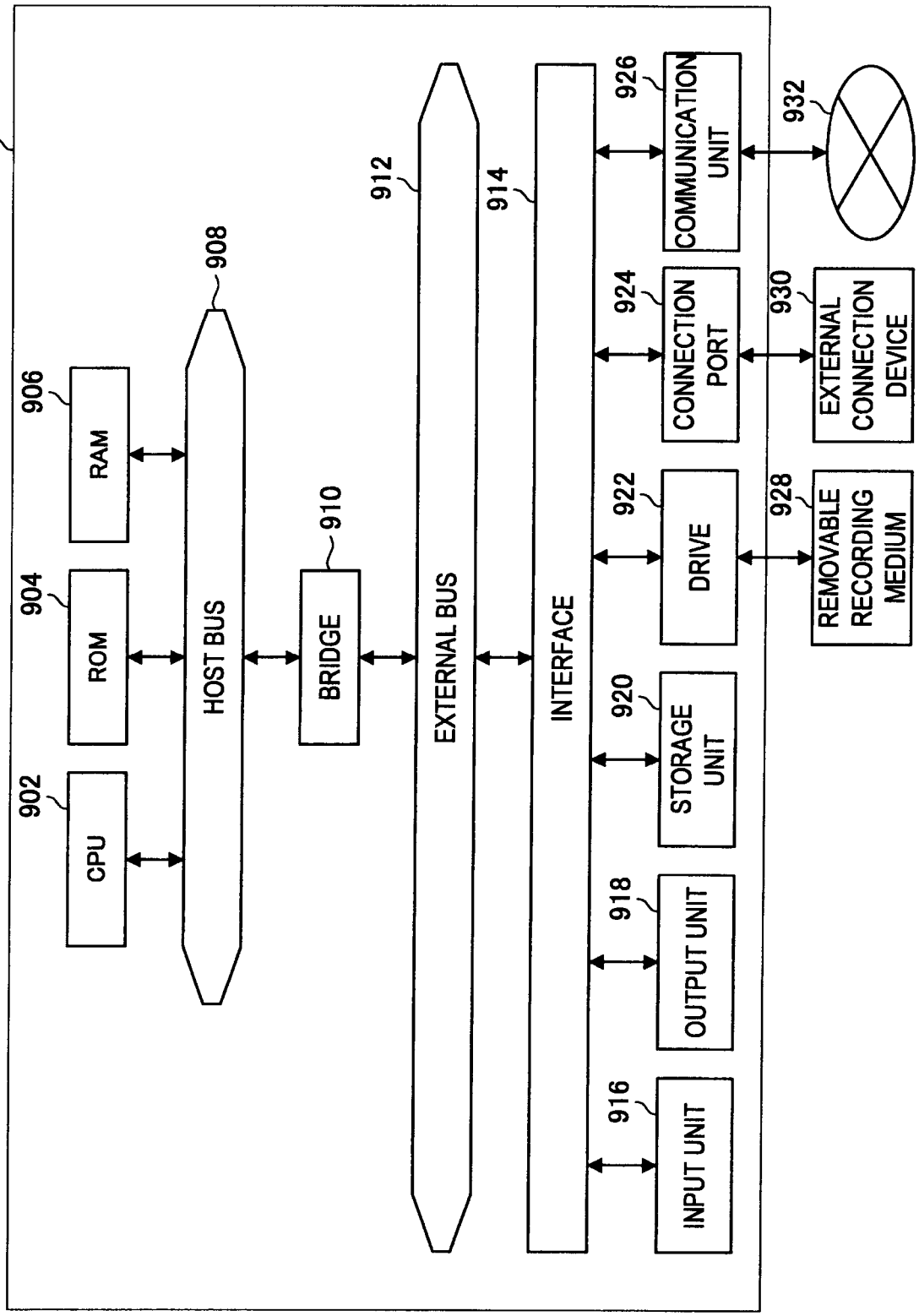
FIG. 21 is an explanatory diagram showing a hardware configuration example of the information processing apparatus according to the present embodiment.

The function of each structural element of the above-described information processing apparatus 100 can be realized, for example, by using the hardware configuration shown in FIG. 21. For example, the function of each structural element is realized by controlling the information processing apparatus as shown in FIG. 21 by using a computer program. The mode of the information processing apparatus shown is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 21, the information processing apparatus is configured mainly from a CPU 902, a ROM 904, a RAM 906, a host bus 908, a bridge 910, an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation of the structural elements or some of the structural elements on the basis of various programs recorded on the ROM 904, the RAM 906, the storage unit 920, or a removal recording medium 928. The ROM 904 is means for storing, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program.

These structural elements are connected to each other by, for example, the host bus 908 which can perform high-speed data transmission. On the other hand, the host bus 908 is connected to the external bus 912 whose data transmission speed is relatively low through the bridge 910, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile that can visually or auditorily notify a user of acquired information. Moreover, the CRT is an abbreviation for Cathode Ray Tube. Furthermore, the PDP is an abbreviation for Plasma Display Panel.

The storage unit 920 is a device to store various data. The storage unit 920 is, for example, a magnetic storage device such as an HDD, a semiconductor storage device, an optical storage device, or a magneto-optical storage device. Moreover, the HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blue-ray medium, an HD-DVD medium, a memory stick, or an SD (Secure Digital) memory card. As a matter of course, the removal recording medium 928 may be, for example, an IC card on which a non-contact IC chip is mounted or an electronic device. Moreover, the IC is an abbreviation for Integrated Circuit.

The connection port 924 is a port such as an USB port, an IEEE1394 port, a SCSI, an RS-232C port, or a port for connecting an external connection device 930 such as an optical audio terminal. The external connection device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is, for example, the Internet, a home-use LAN, infrared communication, visible light communication, broadcasting, or satellite communication. Moreover, the LAN is an abbreviation for Local Area Network. Also, the WUSB is an abbreviation for Wireless USB. Furthermore, the ADSL is an abbreviation for Asymmetric Digital Subscriber Line.

(2-9: Conclusion)

Lastly, the functional configuration of the information processing apparatus of the present embodiment, and the effects obtained by the functional configuration will be briefly described.

First, the functional configuration of the information processing apparatus according to the present embodiment can be expressed as follows. The information processing apparatus includes an input information recording unit and an object behaviour control unit as described below. The input information recording unit is for recording, when a movement stroke for an object is input, information on moving speed and movement stroke of an input tool used for inputting the movement stroke. Also, the object behaviour control unit is for moving the object, based on the information on moving speed and movement stroke recorded by the input information recording unit, in such a way that the movement stroke of the input tool and a moving speed at each point in the movement stroke are replicated.

As described, by recording the moving speed of the input tool along with the movement stroke, an animation which takes into account information on the moving speed at each point in the movement stroke can be applied to the object. Thus, a user is enabled to easily input information on the speed by moving the input tool quickly at a position where a swift movement is desired and by moving the input tool slowly at a position where a slow movement is desired. As a result, the operability of the user can be greatly improved.

Furthermore, the information processing apparatus described above may include a mode switch unit and an input tool distinguishing unit as described below. The mode switch unit is for switching between a drawing mode for drawing the object and a stroke input mode for inputting the movement stroke for the object. Also, the input tool distinguishing unit is for distinguishing a type of the input tool. The mode switch unit switches to the drawing mode in case the type of the input tool is decided by the input tool distinguishing unit to be a first input tool and switches to the stroke input mode in case the type of the input tool is decided by the input tool distinguishing unit to be a second input tool different from the first input tool.

As described, when two types of input tools can be used as the input tool, the operation step for switching the modes can be simplified by performing a mode switching process by distinguishing the types of the input tools. Moreover, when a touch panel is used as the input tool, a finger or a stylus pen, for example, can be used as the first and the second input tools.

A plurality of partial areas may be set in an area including the object, and specific behaviour types including a movement behaviour may be set for respective partial areas. In this case, the above-described information processing apparatus further includes a behaviour type selection unit for detecting in which of the plurality of partial areas a position touched at a beginning of an input operation by the input tool is included and selecting a behaviour type according to a result of the detection, when the movement stroke for the object is input. The object behaviour control unit makes the object behave according to the behaviour type selected by the behaviour type selection unit.

As described, by selecting the behaviour type according to the part of the object touched at the beginning at the time of inputting the movement stroke for the object, the selection step for the behaviour type is simplified, and thus, the operability is greatly improved. Particularly, in case there are a large number of behaviour types, a bothersome operation step for selecting a desired behaviour type from a large number of menu items can be omitted, and the effect obtained from the configuration according to the present embodiment is significant.

Furthermore, the behaviour type selection unit may be configured to select, in case a partial area to which a behaviour type different from the movement behaviour is set is detected, a behaviour type corresponding to a shape of the movement stroke, based on the information on movement stroke recorded by the input information recording unit. In the present embodiment, the type of the animation is basically the movement behaviour. However, as described above, besides the movement, a rotational behaviour, a resizing behaviour and the like may also be included in the movement types. Accordingly, a partial area may be provided in which a behaviour type different from the movement behaviour is set as the behaviour type. However, if the types of partial areas increase, the operability may be deteriorated. Thus, by setting the behaviours such as the rotation and resizing in a common specific partial area and distinguishing the behaviour type based on the movement stroke of the input tool, the operability can be significantly improved for a case where there are a large number of behaviour types.

For example, the setting is performed so that the rotational behaviour is selected when a curve is drawn by the input tool, and the resizing behaviour is selected when a straight line is drawn. In this manner, by associating the shape of the movement stroke and the behaviour type, an easily comprehensible operating system where intuitive gesture inputs are combined is realized.

Furthermore, in case a plurality of the movement strokes are input by a plurality of the input tools, the input information recording unit records information on the movement stroke input by each input tool. The behaviour type selection unit selects a behaviour type based on the information on the movement stroke relating to each input tool recorded by the input information recording unit. As described, the technology according to the present embodiment may be extended to an operating system using a plurality of input tools. For example, when a touch panel is used as the input tool, operation may be performed with a plurality of fingers or a combination of a finger and another input tool. By using a plurality of input tools at the same time, processing can be switched according to the relative positional relationship between a plurality of input tools or a combination of the movement strokes input by respective input tools. Also, it becomes possible to virtually take into the operating system movements that a user carries out in real life using a plurality of fingers, and the operability and the functionality can be significantly improved. For example, if the resizing behaviour is associated with a movement stroke of extending an object outward by using two fingers, an intuitive operating system is realized for the resizing behaviour. Also, if the rotational behaviour is associated with a movement stroke of rotating the edge of an object with one finger while putting another finger at the centre of the object, an intuitive operating system is realized in relation to the rotational behaviour.

Furthermore, an area including the object may be formed from a plurality of adjoining small rectangular areas, each smaller than one minimum-sized rectangular area capable of including a whole of the object, and each of the small rectangular areas may include a part of the object. The shape of an object freely drawn by a user is not limited to be rectangular. Thus, if the object is enclosed by a rectangular area, the boundary of the rectangular area may be positioned far away from the boundary of the object. Accordingly, an inconvenience may arise if the behaviour type is distinguished by enclosing an object by a rectangular area and setting a plurality of partial areas in the rectangular area.

For example, in case the rotational behaviour is set at the partial areas positioned at the four corners of the rectangular area, if the object is a circle, a user has to perform the rotational behaviour by holding a part where no object is drawn. Thus, the area enclosing the object is to be made similar to the shape of the object, and the partial areas are to be provided in the area having a shape similar to the shape of the object. With this configuration, the user has to focus only on the area where the object is displayed. As a result, the operability can be significantly improved.

Furthermore, the information processing apparatus may further include an input position detection unit for detecting position coordinates of the input tool every specific time period, and an interpolation coordinate computation unit for computing interpolation coordinates to interpolate between the position coordinates of the input tool detected by the input position detection unit every specific time unit. In this case, the input information recording unit records, as the information on movement stroke, the position coordinates detected by the input position detection unit and the interpolation coordinates computed by the interpolation coordinate computation unit. With a digital device, information on movement stroke input by the input tool is recorded as a collection of location coordinates obtained every specific time period.

Thus, when the moving speed of the input tool is high, the gap between the obtained position coordinates becomes large.

Furthermore, when the gap between the position coordinates becomes large, the movement of an object moved and displayed based on the position coordinates becomes awkward. Thus, the above-described information processing apparatus computes coordinates (interpolation coordinates) for interpolating the position coordinates recorded every specific time period, and uses a collection of position coordinates including the interpolation coordinates at the time of moving and displaying an object. With this configuration, the movement of an object becomes smooth and natural.

Furthermore, in case an input operation by the input tool is detected during a movement control of the object by the object behaviour control unit, the behaviour type selection unit may select the behaviour type with a position of the partial area at a time point of the detection as a reference. With this configuration, even when an object is being moved, a new animation can be easily applied.

By making the position of an object at a time point of starting the input operation the reference as with the above-described configuration, a user can comfortably perform an input operation of a movement stroke without being baffled by the movement of the object. As a result, the user can apply animations one by one while checking the movement, without applying all the animations at the same time. Accordingly, it becomes possible to proceed with the task while checking the impression given by the animation.

(Remarks)

The above-described position detection unit 112 and the speed detection unit 114 are examples of the input information recording unit. The above-described display control unit 124 is an example of the object behaviour control unit. The above-described image processing unit 104 is an example of the mode switch unit and the input tool distinguishing unit. The above-described behaviour distinguishing unit 120 is an example of the behaviour type selection unit. The above-described input device 102, finger 10 and stylus 12 are examples of the input tool. The above-described animation type is an example of the behaviour type. The above-described animation target area A2 is an example of the area including an object. The above-described small area is an example of a small rectangular area. The above-described input device 102 is an example of the input position detection unit. The above-described interpolation processing unit 126 is an example of the interpolation coordinate computation unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-17192 filed in the Japan Patent Office on Jan. 28, 2009, the entire content of which is hereby incorporated by reference.

What is claimed is:

1. An information processing apparatus having a storage device with computer-readable instructions for animating an object, comprising:
    at least one processor;
    an input information recording unit configured to record, when a movement stroke for the object is input, information on moving speed and movement stroke of an input tool used for inputting the movement stroke using the at least one processor; and
    an object behaviour control unit configured to animate the object, based on the information on moving speed and movement stroke recorded by the input information recording unit, in such a way that the movement stroke of the input tool and a moving speed at each point in the movement stroke are replicated as an animation for viewing at a later time in response to a user request to replicate a previously recorded user input using the at least one processor.

2. The information processing apparatus according to claim 1, further comprising:
    a mode switch unit configured to switch between a drawing mode for drawing the object and a stroke input mode for inputting the movement stroke for the object using the at least one processor; and
    an input tool distinguishing unit configured to distinguish a type of the input tool using the at least one processor,
    wherein
        the mode switch unit
            switches to the drawing mode in case the type of the input tool is decided by the input tool distinguishing unit to be a first input tool, and
            switches to the stroke input mode in case the type of the input tool is decided by the input tool distinguishing unit to be a second input tool different from the first input tool.

3. The information processing apparatus according to claim 1, wherein
    a plurality of partial areas are set in an area including the object, and specific behaviour types including a movement behaviour are set for respective partial areas,
    the information processing apparatus further includes a behaviour type selection unit for detecting in which of the plurality of partial areas a position touched at a beginning of an input operation by the input tool is included and selecting a behaviour type according to a result of the detection, when the movement stroke for the object is input using the at least one processor, and
    the object behaviour control unit makes the object behave according to the behaviour type selected by the behaviour type selection unit.

4. The information processing apparatus according to claim 3, wherein
    the behaviour type selection unit selects, in case a partial area to which a behaviour type different from the movement behaviour is set is detected, a behaviour type corresponding to a shape of the movement stroke, based on the information on movement stroke recorded by the input information recording unit.

5. The information processing apparatus according to claim 3, wherein,
    in case a plurality of the movement strokes are input by a plurality of the input tools,
    the input information recording unit records information on the movement stroke input by each input tool, and
    the behaviour type selection unit selects a behaviour type based on the information on the movement stroke relating to each input tool recorded by the input information recording unit.

6. The information processing apparatus according to claim 3, wherein,
    in case an input operation by the input tool is detected during a movement control of the object by the object behaviour control unit, the behaviour type selection unit selects the behaviour type with a position of the partial area at a time point of the detection as a reference.

7. The information processing apparatus according to claim 1, wherein
an area including the object is formed from a plurality of adjoining small rectangular areas, each smaller than one minimum-sized rectangular area capable of including a whole of the object, and each of the small rectangular areas includes a part of the object.

8. The information processing apparatus according to claim 1, further comprising:
an input position detection unit for detecting position coordinates of the input tool every specific time period using the at least one processor; and
an interpolation coordinate computation unit for computing interpolation coordinates to interpolate between the position coordinates of the input tool detected by the input position detection unit every specific time unit using the at least one processor,
wherein
the input information recording unit records, as the information on movement stroke, the position coordinates detected by the input position detection unit and the interpolation coordinates computed by the interpolation coordinate computation unit.

9. A method for animating an object displayed on an electronic device, the method comprising the steps of:
recording, when a movement stroke for an object is input to the electronic device, information on moving speed and movement stroke of an input tool used for inputting the movement stroke; and
animating the object, based on the information on moving speed and movement stroke recorded in the step of recording, in such a way that the movement stroke of the input tool and a moving speed at each point in the movement stroke are replicated as an animation for viewing at a later time in response to a user request to replicate said recording.

10. The method according to claim 9, wherein the method is performed by a computer upon execution by the computer of a program embodied on a non-transitory, computer-readable medium.

11. An apparatus configured to generate a replicated animation of a user input, wherein the apparatus comprises a graphical user interface configured to:
record movement speeds and movement directions of the user input; and
generate the replicated animation of the previous user input based on the recorded movement speeds and movement directions, wherein the replicated animation is generated at a later time from the recording of the user input in response to a user request to replicate the previously recorded user input.

12. The apparatus of claim 11, wherein the graphical user interface comprises a touch panel configured to receive the user input.

13. The apparatus of claim 12, wherein the user input is at least one of a human finger and a stylus interfacing with the touch panel.

14. The apparatus of claim 13, wherein the user input is at least one of a human finger and a stylus touching the touch panel.

15. The apparatus of claim 11, wherein:
the graphical user interface is configured to switch between a drawing mode and an animation mode; and
the apparatus records movement speeds and movement directions in the animation mode.

16. The apparatus of claim 15, wherein the apparatus does not record movement speeds and movement directions in the drawing mode.

17. The apparatus of claim 15, wherein the apparatus switches between the drawing mode and the animation mode based on use of different types of user inputs.

18. The apparatus of claim 17, wherein two types of user inputs are a human finger and a stylus.

19. The apparatus of claim 11, wherein the graphical user interface is configured to:
detect a predetermined behavior movement based on the recorded movement speeds and movement directions; and
in response to the detected predetermined behavior movement the apparatus performs a predetermined function associated with the detected predetermined behavior movement.

20. The apparatus of claim 19, wherein the predetermined function comprises at least one of a movement function, a rotational function, and a resizing function.

* * * * *